United States Patent [19]

Slade et al.

[11] Patent Number: 5,550,735
[45] Date of Patent: Aug. 27, 1996

[54] COMPILING SYSTEM AND METHOD FOR MASS PRODUCING INDIVIDUALLY CUSTOMIZED MEDIA

[75] Inventors: Michael G. Slade, San Francisco; Darren J. LaBatt, Walnut Creek, both of Calif.

[73] Assignee: Datavision Technologies, San Francisco, Calif.

[21] Appl. No.: 311,198

[22] Filed: Sep. 23, 1994

Related U.S. Application Data

[63] Continuation of Ser. No. 935,852, Aug. 26, 1992, abandoned.

[51] Int. Cl.$^6$ ............... G06F 17/60; G06G 7/52; G11B 17/22; G11B 3/64
[52] U.S. Cl. ........... 364/401 R; 364/400; 369/30; 369/34; 369/35; 369/83; 369/84; 369/85; 360/55
[58] Field of Search ............ 360/14.1, 55, 78.01, 360/78.02, 78.03; 369/14, 30, 33, 34, 35, 83, 84, 85; 364/281.6, 281.8, 401, 400, 402; 358/335, 341, 342

[56] References Cited

U.S. PATENT DOCUMENTS

| | | | |
|---|---|---|---|
| 3,654,708 | 4/1972 | Brudner | 434/307 R |
| 3,922,641 | 11/1975 | Gates Jr. | 340/825.03 |
| 4,602,279 | 7/1986 | Freeman | 348/10 |
| 4,685,003 | 8/1987 | Westland | 360/14.1 |
| 4,725,977 | 2/1988 | Izumi et al. | 395/442 |
| 4,745,549 | 5/1988 | Hashimoto | 364/402 |
| 4,863,384 | 9/1989 | Slade | 434/107 |
| 4,905,094 | 2/1990 | Pocock et al. | 358/342 |
| 4,918,516 | 4/1990 | Freeman | 348/11 |
| 4,924,303 | 5/1990 | Brandon et al. | 348/7 |
| 4,941,040 | 7/1990 | Pocock et al. | 348/7 |
| 5,099,422 | 3/1992 | Foresman et al. | 364/401 |
| 5,172,242 | 12/1992 | Yamaguchi et al. | 358/342 |

*Primary Examiner*—Donald E. McElheny Jr.
*Assistant Examiner*—Stephen R. Tkacs
*Attorney, Agent, or Firm*—Bernard L. Kleinke; Peter P. Scott

[57] ABSTRACT

A compiling system which can mass produce individually customized media, such as videotapes in a highly efficient and cost effective manner. High volume production is realized by matrixing synchronized system resources, such as videodisc players, videocassette recorders, and graphic generator units. The resources are managed using a predetermined client/server model of computing over a local area network. The resources are synchronized by supplying all time dependent system nodes with the same time base criteria, which in turn, is also utilized to synchronize non-time dependent resources.

16 Claims, 24 Drawing Sheets

ROUTING SWITCHER MATRIX

581 → DESTINATIONS
580 → SOURCES

| SOURCES | GRAPHICS SERVER 1 | GRAPHICS SERVER 2 | GRAPHICS SERVER 3 | GRAPHICS SERVER 4 | VCR 1 | VCR 2 | VCR 3 | VCR 4 | VCR 5 | VCR 6 | VCR 7 | VCR 8 | VCR 9 | VCR 10 | VCR 11 | VCR 12 | VCR 13 | VCR 14 | VCR 15 | VCR 16 |
|---|---|---|---|---|---|---|---|---|---|---|---|---|---|---|---|---|---|---|---|---|
| BLACK | | | | | | | | | | | | | | | | | | | | |
| VIDEODISC PLAYER 1 VIDEO | | | | | | | | | | | | | | | | | | | | |
| VIDEODISC PLAYER 1 AUDIO 1 | | | | | | | | | | | | | | | | | | | | |
| VIDEODISC PLAYER 1 AUDIO 2 | | | | | | | | | | | | | | | | | | | | |
| VIDEODISC PLAYER 2 VIDEO | | | | | | | | | | | | | | | | | | | | |
| VIDEODISC PLAYER 2 AUDIO 1 | | | | | | | | | | | | | | | | | | | | |
| VIDEODISC PLAYER 2 AUDIO 2 | | | | | | | | | | | | | | | | | | | | |
| VIDEODISC PLAYER 3 VIDEO | | | | | | | | | | | | | | | | | | | | |
| VIDEODISC PLAYER 3 AUDIO 1 | | | | | | | | | | | | | | | | | | | | |
| VIDEODISC PLAYER 3 AUDIO 2 | | | | | | | | | | | | | | | | | | | | |
| VIDEODISC PLAYER 4 VIDEO | | | | | | | | | | | | | | | | | | | | |
| VIDEODISC PLAYER 4 AUDIO 1 | | | | | | | | | | | | | | | | | | | | |
| VIDEODISC PLAYER 4 AUDIO 2 | | | | | | | | | | | | | | | | | | | | |
| VIDEODISC PLAYER 5 VIDEO | | | | | | | | | | | | | | | | | | | | |
| VIDEODISC PLAYER 5 AUDIO 1 | | | | | | | | | | | | | | | | | | | | |
| VIDEODISC PLAYER 5 AUDIO 2 | | | | | | | | | | | | | | | | | | | | |
| VIDEODISC PLAYER 6 VIDEO | | | | | | | | | | | | | | | | | | | | |
| VIDEODISC PLAYER 6 AUDIO 1 | | | | | | | | | | | | | | | | | | | | |
| VIDEODISC PLAYER 6 AUDIO 2 | | | | | | | | | | | | | | | | | | | | |
| VIDEODISC PLAYER 7 VIDEO | | | | | | | | | | | | | | | | | | | | |
| VIDEODISC PLAYER 7 AUDIO 1 | | | | | | | | | | | | | | | | | | | | |
| VIDEODISC PLAYER 7 AUDIO 2 | | | | | | | | | | | | | | | | | | | | |
| VIDEODISC PLAYER 8 VIDEO | | | | | | | | | | | | | | | | | | | | |
| VIDEODISC PLAYER 8 AUDIO 1 | | | | | | | | | | | | | | | | | | | | |
| VIDEODISC PLAYER 8 AUDIO 2 | | | | | | | | | | | | | | | | | | | | |
| GRAPHIC SERVER 1 | | | | | | | | | | | | | | | | | | | | |
| GRAPHIC SERVER 2 | | | | | | | | | | | | | | | | | | | | |
| GRAPHIC SERVER 3 | | | | | | | | | | | | | | | | | | | | |
| GRAPHIC SERVER 4 | | | | | | | | | | | | | | | | | | | | |

Application Example

The Great Cars, Inc. data collection instrument:

Please tell us at Great Cars a little about yourself, so we can suggest the right Great Car and options for your driving pleasure.

Name _____ 1100

Street _____

City _____ State ____ Zip ____ 1102

How many passengers do you usually have in your car?
    ☐ 0  ☐ 1  ☐ 2  ☐ 3  ☐ 4

What activities do you participate in that require your car?
    ☐ Skiing  ☐ Off-Road What is your age?
    ☐ 16-25  ☐ 26-35  ☐ 36-50  ☐ 51-100

Are you ☐ male? or ☐ female?

A typical raw data set generated from the questionnaire might be:

```
name          John Smith
street        123 Maple Lane
city          Anytown
state         CA
zip           94555
passengers    2
skiing        yes
off-road      no
trailering    no
age           36-50
sex           male
```
↖ 702

FIG. 7B

Once the data set has been processed by the data pre-processor the data might be:

```
name             John Smith
street           123 Maple Lane
city             Anytown
state            CA
zip              94555
passengers       2
skiing           yes
off-road         no
trailering       no
age              36-50
sex              male
recommended_car  X-47 Sedan
testimonial      George Jones
options          White Sidewall Tires,
                 Air Conditioning,
                 Ski Rack
dealer_id        12345
dealer_name      Great Car City
dealer_street    123 Industrial Blvd.
dealer_city      Anytown
dealer_state     CA
```
FIG. 7C  ↖ 704

```
        (\t\tSuggested Options:) show
        0 300 moveto
        (\t\tWhite Sidewall Tires) show
        0 200 moveto
        (\t\tAir Conditioning) show
        0 100 moveto
        (\t\tSki Rack) show
}
/* Show segment: Suggested Dealer */
cur_time = cur_time + 20:00
@ cur_time
title TITLER
{
        %load_ips dlrbknd.ips
        0 400 moveto
        (\t\tDealer Nearest You:) show
        0 300 moveto
        (\t\tGreat Car City) show
        0 200 moveto
        (\t\t123 Industrial Blvd.) show
        0 100 moveto
        (\t\tAnytown, CA) show
}
/* Show segment: Owner Testimonial */
cur_time = cur_time + 10:00
@ cur_time
play PLAYER segment George_Jones for 1:00:00
route from PLAYER to VCR
/* Show segment: Great Cars Story */
cur_time = cur_time + 1:00:00
@ cur_time
play PLAYER segment GreatCarsStory for 1:00:00
route from PLAYER to VCR
/* End with 5 seconds of black */
cur_time = cur_time + 1:00:00
@ cur_time
route from Black to VCR
/* Finish up; release resources */
cur_time = cur_time + 5:00
@ cur_time
stop VCR
eject VCR
release vcr VCR
release titler TITLER
```

FIG. 7F

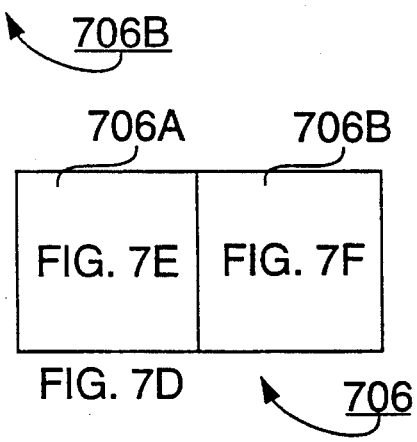

FIG. 7D

Once the processed data exists it can be used with the video report description to produce a video report file:

```
/* Video Report File -- Great Cars, report for John Smith, 2/19/92 */
/* Start up; get needed resources */
@ start_time
get vcr VCR
record VCR
get titler TITLER
route from Black to VCR /* Start with 5 seconds of black */
route from Black to TITLER
/* Show segment: Opening */
cur_time = start_time + 5:00
@ cur_time
play PLAYER segment Intro_A for 1:00:00   /* play audio for car 47 */
route left from PLAYER to VCR
mix VCR 0 m m m 0 m m m    /* route channel 1 (i.e. left) audio from VDP
to both channels of VCR */
title TITLER
{
        %load_ips car47.ips
        0 300 moveto
        (\t\tThank You,) show
        0 200 moveto
        (\t\tJohn Smith) show
}
route video from TITLER to VCR
/* Show segment: Suggested Car */
cur_time = cur_time + 20:00
@ cur_time
title TITLER
{
        %load_ips car47.ips
        0 110 moveto
        (\t\tJohn Smith's) show
        0 10 moveto
        (\t\tnew X-47 Sedan) show
}
/* Show segment: Suggested Options*/
cur_time = cur_time + 10:00
@ cur_time
title TITLER
{
        %load_ips car47.ips
        0 400 moveto
```

The video report file can then be submitted to the sheduler.
The scheduler engages in the following dialog with the various
servers to establish what specific resources will be used to make
the videotape:

/* Events List – Great Cars, report for John Smith, 2/19/92 */
/* Start time: 00:00:00:00; show id: GC920219_1 */

/* Allocations; events generated during scheduling: */
vcr allocate @ 00:00:00:00 to 00:03:10:00 show GC920219_1
    Reply: VCR1
titler allocate @ 00:00:00:00 to 00:03:10:00 show GC920219_1
    Reply: Titler1
router allocate destination VCR1 @ 00:00:00:00 to 00:03:10:00 show GC920219_1
    Reply: allocated
router allocate destination Titler1 @ 00:00:00:00 to 00:03:10:00 show GC920219_1
    Reply: allocated
player allocate segment Intro_A @ 00:00:05:00 to 00:01:05:00 show GC920219_1
    Reply: VDP1
player allocate segment George_Jones @ 00:01:05:00 to 00:02:05:00 show
GC920219_1
    Reply: VDP3
player allocate segment GreatCarsStory @ 00:02:05:00 to 00:03:05:00 show
GC920219_1
    Reply: VDP4

FIG. 7G

```
        (\t\tSki Rack) show
} titler Titler1 @ 00:00:55:00 show GC920219_1 body {
        %load_ips dlrbknd.ips
        0 400 moveto
        (\t\tDealer Nearest You:) show
        0 300 moveto
        (\t\tGreat Car City) show
        0 200 moveto
        (\t\t123 Industrial Blvd.) show
        0 100 moveto
        (\t\tAnytown, CA) show
} player play VDP3 segment George_Jones @ 00:01:05:00 show GC920219_1
router from VDP3 to VCR1 @ 00:01:05:00 show GC920219_1 player play VDP4 segment GreatCarsStory @ 00:02:05:00 show GC920219_1
router from VDP4 to VCR1 @ 00:02:05:00 show GC920219_1 router from Black to VCR1 @ 00:03:05:00 show GC920219_1 vcr stop VCR1 @ 00:03:10:00 show GC920219_1
vcr eject VCR1 @ 00:03:10:00 show GC920219_1
```

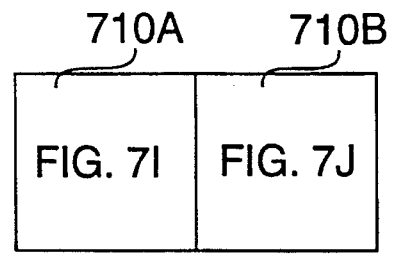

FIG. 7H

Once the resources have been allocated, the scheduler sends out events to the various servers:

```
/* Events dispatched to servers at the end of scheduling: */
     /* The reply to each message is: queued */
vcr record VCR1 @ 00:00:00:00 show GC920219_1
router from Black to VCR1 @ 00:00:00:00 show GC920219_1
router from Black to Titler1 @ 00:00:00:00 show GC920219_1 player play VDP1 segment Intro_A @ 00:00:05:00 show GC920219_1
router left from VDP1 to VCR1 @ 00:00:05:00 show GC920219_1
vcr mix VCR1 0 m m m 0 m m m @ 00:00:05:00 show GC920219_1
titler Titler1 @ 00:00:05:00 show GC920219_1 body {
        %load_ips car47.ips
        0 300 moveto
        (\t\tThank You,) show
        0 200 moveto
        (\t\tJohn Smith) show
} titler Titler1 @ 00:00:25:00 show GC920219_1 body {
        %load_ips car47.ips
        0 110 moveto
        (\t\tJohn Smith's) show
        0 10 moveto
        (\t\tnew X-47 Sedan) show
} titler Titler1 @ 00:00:35:00 show GC920219_1 body {
    %load_ips car47.ips
    0 400 moveto
    (\t\tSuggested Options:) show
    0 300 moveto
    (\t\tWhite Sidewall Tires) show
    0 200 moveto
    (\t\tAir Conditioning) show
    0 100 moveto
```

COMPILING SYSTEM AND METHOD FOR MASS PRODUCING INDIVIDUALLY CUSTOMIZED MEDIA

CROSS-REFERENCE TO RELATED APPLICATIONS

This application is a continuation of U.S. patent application Ser. No. 07/935,852 filed Aug. 26, 1992 and entitled "COMPILING SYSTEM AND METHOD FOR MASS PRODUCING INDIVIDUALLY CUSTOMIZED MEDIA," now abandoned, which is incorporated by reference as if fully set forth herein.

TECHNICAL FIELD

This invention relates generally to compiling systems and methods of mass producing individually customized media. More particularly, this invention relates to a compiling system that facilitates the mass production of individually customized media.

BACKGROUND ART

There have been many types and kinds of compiling systems used to produce recording media, such as videotape recordings. For example, reference may be made to the following U.S. Pat. Nos. 4,941,040; 4,924,303; 4,918,516; 4,905,094; 4,863,384; 4,775,935; 4,745,549; 4,725,977; and 4,602,279.

As disclosed in the foregoing mentioned patents, various compiling systems include data base memory units with prerecorded segments and segment processors for selecting and directing individual ones of the pre-recorded segments for recording on a desired recording media such as a video recording tape via a videocassette recorder. In this manner, customer selected segments of prerecorded materials, such as a plurality of music videos, may be retrieved from the data base memory units and directed to a designated videocassette recorder for recording the selected segments on the desired recording media.

While such compiling systems may have been satisfactory for some applications, it would be highly desirable to have a new and improved compiling system which is highly efficient and able to increase productivity significantly so that a high volume of individually customized recording media can be produced. Increasing volume production has been expensive when using previously known systems. In this regard, it has been necessary to increase the number of system components, such as videodisc players, graphic generators, and videocassette recorders substantially to increase volume production. Thus, even though high volume production could be achieved, such high volume production could not be accomplished without a significant increase in capital cost for the necessary additional components.

Therefore, it would be highly desirable to have a new and improved compiling system, which can produce a high volume of individually customized recording media in a highly efficient manner and without requiring mass duplication of each system component.

DISCLOSURE OF INVENTION

Therefore, the principal object of the present invention is to provide a new and improved compiling system and method of using it, wherein individually customized media are mass produced in a highly efficient and cost effective manner.

Briefly, the above and further objects of the present invention are realized by providing a new and improved compiling system which can mass produce individually customized recording media, such as videotapes in a highly efficient and cost effective manner. High volume production is realized by matrixing synchronized system resources, such as videodisc players, videocassette recorders, and graphic generator units. The resources are managed using a predetermined client/server model of computing over a local area network. The audio and video resources are matrixed using a routing switcher to provide simultaneous access of all resources to all destinations. The resources are synchronized by supplying all time dependent system nodes with the same time base criteria, which in turn, is also utilized to synchronize non-time dependent resources. In this regard, by managing required audio, video and graphic events required by each system node over a given time base, resources are shared thereby allowing efficient videotape production without the necessity of mandating system resource duplication.

The compiling system includes a scheduling device, a routing device and a plurality of audio/video resource and destination devices. The audio/video devices include M number of media utilization devices, such as videocassette recorders, and N number of segment memory devices, such as videodisc players, for supplying X number of information segments. For the purpose of causing intended information segments to be presented to the appropriate media utilization device at the appropriate time, a scheduling device causes at least one of N number of segment memory devices to supply information to at least one of the M number of media utilization devices. M represents the number of individually customized media to be produced during each production run, and X represents the number of different segments that are available for selection by a customer for transferring to the customized media. The scheduling device also causes at least one of the segment memory devices to be operating in an off-line mode of operation to permit the access of another information segment in preparation for supplying such information segment to the utilization devices upon its completion.

In one form of the invention, the system employs P number of graphic units to permit graphic overlays to be transferred to the M number of individually customized media to be produced during each production run.

Thus, the system of this invention provides a new and improved compiling system which enables a high volume of customized media utilization devices, such as cable television channels, videocassette tapes, videotapes, or other such devices, to be produced in a highly efficient and cost effective manner. Each medium device contains pre-recorded information segments, such as music video segments, selected by an end user recipient. Such a customized storage media can be utilized by the end user recipient, on widely available conventional videocassette players, audio cassette players, and other such devices.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 6 is a typical matrix architecture of destination resources and source resources of FIG. 1;

FIG. 7A–J is a process for using the system of FIG. 1 to produce a script;

BEST MODE FOR CARRYING OUT THE INVENTION

The detailed description that follows is organized according to the following outline:

A. GENERAL DESCRIPTION OF COMPILING SYSTEM FOR MASS PRODUCING INDIVIDUALLY CUSTOMIZED MEDIA.
B. DETAILED HARDWARE DESCRIPTION.
C. SYSTEM SOFTWARE

A. GENERAL DESCRIPTION OF COMPILING SYSTEM FOR MASS PRODUCING INDIVIDUALLY CUSTOMIZED MEDIA

Figure 1:
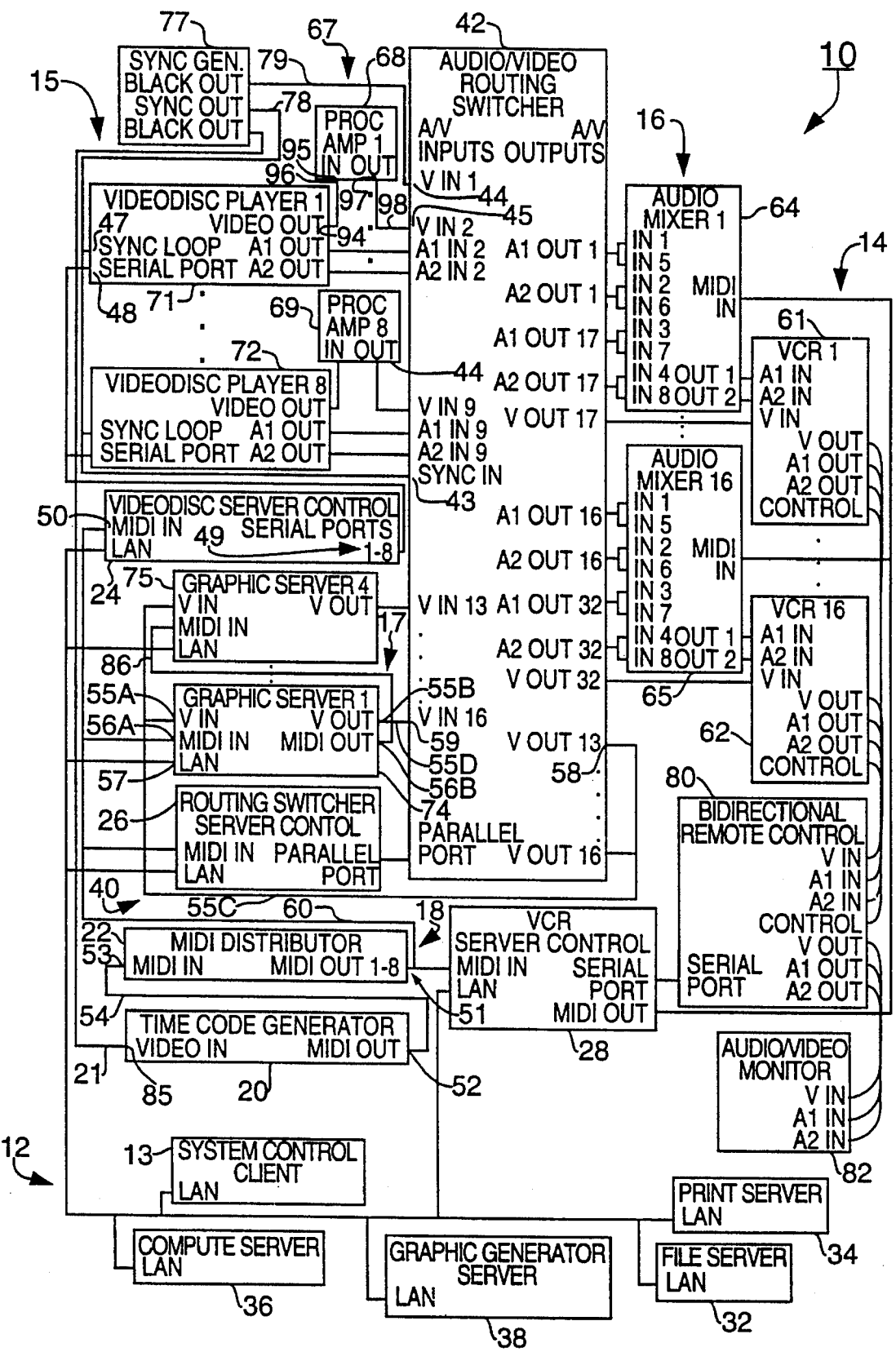
FIG. 1 is a block diagram of a compiling system which is constructed in accordance with the present invention.
Figure 2:
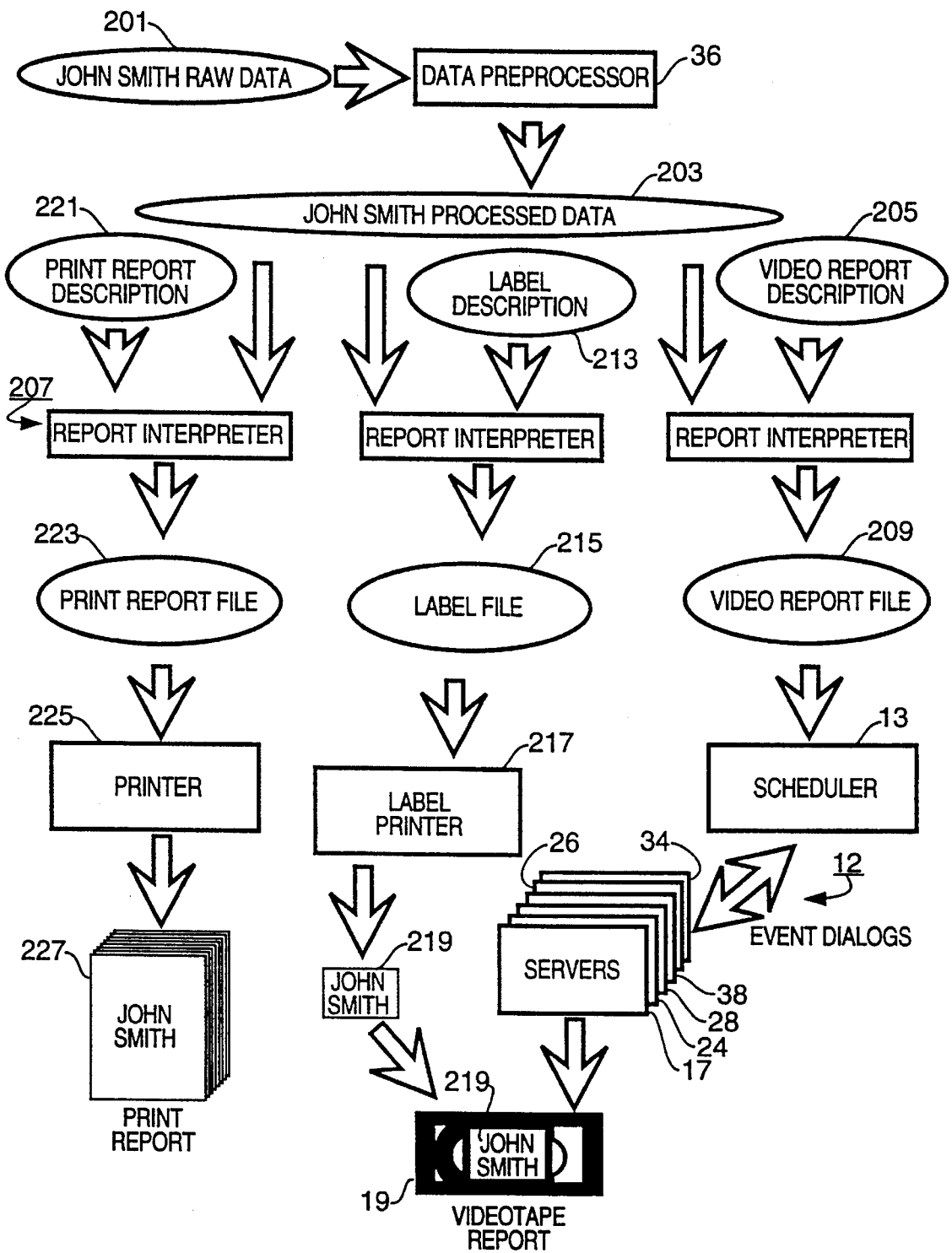
FIG. 2 is a data flow diagram for the compiling system of FIG. 1.

Referring now to the drawings, and more particularly to FIG. 1, there is shown a high volume compiling system 10, which is constructed in accordance to the present invention. The system 10 allows for high volume creation of a recorded media storage device, such as a videotape 19 (FIG. 2). In this regard, the audio and video resources utilized for providing information segments to the media storage device 19 are configured via a matrix architecture 501 (FIG. 6) for high volume time synchronized production to insure optimum resource utilization during any given production operation. Such a matrix architecture 501 permits such resources to be shared, allowing different recorded media storage devices to be produced simultaneously, and thus, resulting in a low cost, high volume production system.

The high volume compiling system 10 generally includes a local area network or LAN indicated generally at 12 having a scheduling processor or system control client 13 for reconfiguring and allocating the system audio/video resources dynamically in real time on the fly. In this regard, the scheduling processor 13 generates resources scripts for time sharing the system audio/video resources. Such scripts or media processes, of which several may be running in the system at any given time, assume dedicated control of system resources that may be activated at any time and share those system resources that must be synchronized or scheduled in order to prevent simultaneous access to a commonly shared resource that may not be shared simultaneously.

System resources that generally require scheduling include a group 14 of videocassette recorders (VCR-1 to VCR-16), including a videocassette recorder 61 and a videocassette recorder 62, a group 15 of videodisc players or presentation memory devices (VDP-1 to VDP-8), such as a videodisc player 71 and a videodisc player 72, a group 16 of audio mixers (AM-1 to AM-16), such as an audio mixer 64 and an audio mixer 65 and a group 17 of graphic overlay units or servers (G-1 to G-4), such as a graphic server 74 and a graphic server 75. As will be explained hereinafter, the group 17 of graphic servers can function both as resource video devices and destination video devices.

The volume of recorded media storage devices that can be created at any one time is determined by the number of available audio/video resources scaled by the complexity of the videotape programs being created and absolutely limited by the number of videocassette recorders 14 included in the system 10. In this regard, at maximum throughput efficiency, all of the audio/video resources including the videocassette recorders 14 are actively creating videotapes. At minimum efficiency, all of the audio/video resources are activated creating but a single videotape.

From the foregoing, it will be understood by those skilled in the art, that the videotapes created by the system 10 may contain various video information segments supplied via the group 15 of videodisc players, audio information segments supplied by the group 15 of videodisc players via the group 16 of audio mixers and graphic information segments supplied via the group 17 of graphic servers.

The system 10 also includes an audio/video switching subsystem generally indicated at 40 that provides the selection of any of the audio/video resources, such as the videodisc players 71, 72, audio outputs and graphic overlay units 74, 75 to any of the audio/video destination resources, such as the videocassette recorders 61, 62 and audio mixers 64, 65.

The audio/video switching subsystem 40 includes a routing switcher 42 for routing resources in groups 15 and 17 to destination resources in groups 14, 16 and 17, as will be described hereinafter. The scheduling processor 13 communicates with the various subsystem servers to establish what specific system resources will be required for any given tape production process or script to produce a given batch of videotapes.

Those skilled in the art will further understand that the dynamic sharing of the audio/video resources 14–17 allows for the efficient creation of certain programs that need special audio/video resources only for limited periods of time. Further, the dynamic sharing of such audio/video resources 14–17 allows for dynamic reconfiguration or allocation to meet particular video program tape production needs.

In order to synchronize the operation of the various system resources 14–17, the system 10 also includes a MIDI/SMPTE time code subsystem indicated generally at 18. The time code subsystem 18 provides timing references for all processes, synchronized to the system video hardware. The time code subsystem 18 generally includes a MIDI time code generator 20, a MIDI time code distributor 22 and a group of personal computers each having a LAN interface and a MIDI interface. The group of personal computers include a VDP microprocessor or videodisc server control 24, a VCR microprocessor or videocassette recorder server control 28, graphic server microprocessors 74 and 75 in group 17, and the RS microprocessor or routing switcher server control 26. Each of the above mentioned microprocessors are 486 microprocessors such as manufactured by INTEL. Graphic servers within group 17 additionally contain Targa boards and graphic software in a server shell.

Although in the preferred embodiment of the present invention, only a selected number of server controls are indicated, those skilled in the art will understand that other servers can be added to the disclosed configuration. In this regard, such other servers may include a digital audio server to provide another source of audio instead of the videodisc players; an editing videocassette recorder server to provide insertion of information segments into videotapes; an animation server to provide animation created on demand for tapes; and a digital video server to replace various videodisc players as a source in certain instances, and to provide a temporary storage device for an animation server for example.

Considering now the local area network 12 in greater detail with reference to FIG. 1, the LAN 12 includes the above mentioned microprocessors and another group of personal computers or 486 microprocessors that assist in the high volume production of videocassette tapes. Each of the personal computers in the local area network 12 have a bidirectional LAN interface connection. The above mentioned group of microprocessors includes a file microprocessor or file server 32 for storing video report graphic and system files, a printer or print server 34 for printing print report files, a system control client 13, and a data pre-processor or compute server 36 for processing raw client data.

The local area network 12 also includes a powerful graphic generator server 38 in the form of a power graphic work station, such as a NEXT™ work station or a SILICON GRAPHICS™ work station, for creating special two-dimensional or three-dimensional graphic information segments. The graphic generator server 38 can reproduce previously generated graphic information and can create or modify graphics using report data for inclusion in videotapes. In this regard, the graphic generator server 38 in cooperation with the group 17 graphic servers can overlay graphics over video, recall stored graphics, generate new graphics using fonts and drawing primitives, and generate effects between graphics, such as dissolves and wipes.

Considering now the operation of the compiling system 10 with reference to FIGS. 1 and 2, raw data 201 stored in the database memory of the data pre-processor 36 is retrieved and reassembled as processed data 203 as determined by end user requirements. The processed data 203 is then combined with a video report description 205 provided by the file server 32 to the compute server 36 that includes a report interpreter program indicated generally at 207. The compute server 36, via the report interpreter program 207, generates a video report file 209 that is supplied to the scheduling processor 13.

A video report description 205 describes how a video 19 is to be sequenced given any set of data 203. A video may include various elements such as video segments, audio segments, graphics, and other graphical elements with contents from a data set. How these elements are selected for recording a video is described by logic contained in the video report description 205. Besides selection, the logic here also describes the placement in time of audio/video segments and graphic displays as well as the sizing and placement of graphics on a screen. The logical decisions are described using variable unknowns in place of actual items of data, with the understanding that these variables will be replaced with actual items of data by an engine or program that merges the video report description 205 with a set of data 203 to produce an actual recorded video 19. This engine or program is called the report interpreter and is described below.

Anyone familiar with the art of computer programming will understand that a video report description 205 is a program and that the report interpreter 207 is a computing engine or program that executes video report descriptions 205 with data 203 as input.

The report interpreter 207 for video reports is a computing engine or program that takes as input a video report description 205 and a set of data 203. The coupling of a video report description 205 with a set of data 203 describes a recorded video 19, and the task of the report interpreter 207 is to translate this description into another description that is understood by a videotape generating device. This latter description is the output of the report interpreter 207, and it is called a video report file 209.

A video report 209 is a complete description of a customized video containing information on the resources and timing of elements required to produce a videotape. This description can be interpreted by a videotape generating device to produce an actual recorded video 19.

The scheduling processor 13 utilizes the video report file 209 and communicates with the various system servers 24, 26, 28, 32, 34, 38, 74 and 75, via the LAN interface to establish what specific resources will be required to produce a given videotape, such as the videotape 19. Once the resources have been allocated, the scheduling processor 13 supplies each of the servers 24, 26, 28, 32, 34, 38, 74 and 75 with time triggered event information. The servers in turn, such as the servers 24, 26, 28, 32, 34, 38, 74 and 75 cause the various resources, such as the group 14 of videocassette recorders, the group 15 videodisc players, the group 16 of audio mixers, and the group 17 of graphic servers to be to be utilized on a time sharing basis over a given time period for producing one or more of the videotapes, such as the videotape 19. More particularly, the scheduling processor 13 via the routing switcher 42 establishes the matrix architecture 501 by assigning certain ones of the audio, video, graphic resources as a group 581 of destination resources and certain other ones of the audio, video, graphic resources as a group 580 of source resources to insure time sharing usually without simultaneous access unless simultaneous access is otherwise allowed.

A label description 213 describes how a label 219 is to be printed given any set of data 203. A label 219 may include various elements such as paragraphs of text and graphics and elements with contents from a data set 203. How these elements are selected for printing a label 219 is described by logic contained in the label description 213. Besides selection, the logic here also describes the sizing and placement of these elements on a label. The logical decisions are described using variable unknowns in place of actual items of data, with the understanding that these variables will be replaced with actual items of data by an engine or program that merges the label description 213 with a set of data 203 to produce a label file 215 and thereby an actual printed label 219. This engine or program is called the report interpreter 207 and is described below.

Anyone familiar with the art of computer programming will understand that a label description 213 is a program and that the report interpreter 207 is a computing engine or program that executes label descriptions 213 with data 203 as input.

The report interpreter 207 for labels is a computing engine or program that takes as input a label description 213 and a set of data. The coupling of a label description 213 with a set of data 203 describes a printed label 219, and the task of the report interpreter 207 is to translate this description 213 into another description 215 that is understood by a printing device 217. This latter description is the output of the report interpreter 207, and it is called a label file 215, which is described below.

A label file 215 is a complete description of a customized label. This description, which is written in a language such as Adobe PostScript™ can be interpreted by a printer 217 to produce an actual printed label 219.

The scheduling processor 13 utilizes the label file 215 and communicates with the label printer 217 to print a label 219 for a given videotape, such as the videotape 19. In this regard, a label removing device (not shown) removes the label 219 from the label printer 217 and attaches the label 219 to the face of the tape 19 as best seen in FIG. 2.

A report description 221 describes how a report 227 is to be printed given any set of data 203. A print report 227 may include various elements such as paragraphs of text and graphics and elements with contents from a data set 203. How these elements are selected for printing in a report is described by logic contained in the print report description 221. Besides selection, the logic here also describes the sizing and placement on a page of these report elements. These logical decisions are described using variable unknowns in place of actual items of data, with the understanding that these variables will be replaced with actual items of data by an engine or program that merges the print report description 221 with a set of data 203 to produce a print report file 223 that, when executed by a printer 225 produces an actual printed report 227. This engine or program is called the report interpreter 207 and is described below.

Anyone familiar with the art of computer programming will understand that a print report description 221 is a program and that the report interpreter 207 is a computing engine or program that executes print report descriptions 221 with data 203 as input.

The report interpreter 207 for print reports is a computing engine or program that takes as input a print report description 221 and a set of data 203. The coupling of a print report description 221 with a set of data 203 describes a print report 227, and the task of the report interpreter 207 is to translate this description 221 into another description 223 that is understood by a printing device 225. This latter description 223 is the output of the report interpreter 207, and it is called a print report file 223, which is described below.

A print report file 223 is a complete description of a customized report 227. This description, which is written in a language such as Adobe PostScript™, can be interpreted by a printer 225 to produce an actual printed report 227.

The scheduling processor 13 utilizes the print report file 223 and communicates with the report printer 225 to print a print report 227. The print report 227 is then delivered to a customer by the user.

Considering now the operation of the system 10 in still greater detail with reference to FIGS. 1–5, several different types of videotape productions may be executed on the system 10 at any given time. Such productions may require recording one or more groups of individually customized recording media. Three production examples will follow.

For a first example, one production run A may require the production of six (6) videocassette demonstration tapes, each tape having a single video information segment, two (2) audio segments and a single graphic information segment, such as a title. Such a production would utilize three (3) videodisc players, two (2) graphic servers, six (6) audio mixers. For the purpose of this example, the allocated video, graphic, and audio resources are assumed to be the only resources available.

Figure 3:
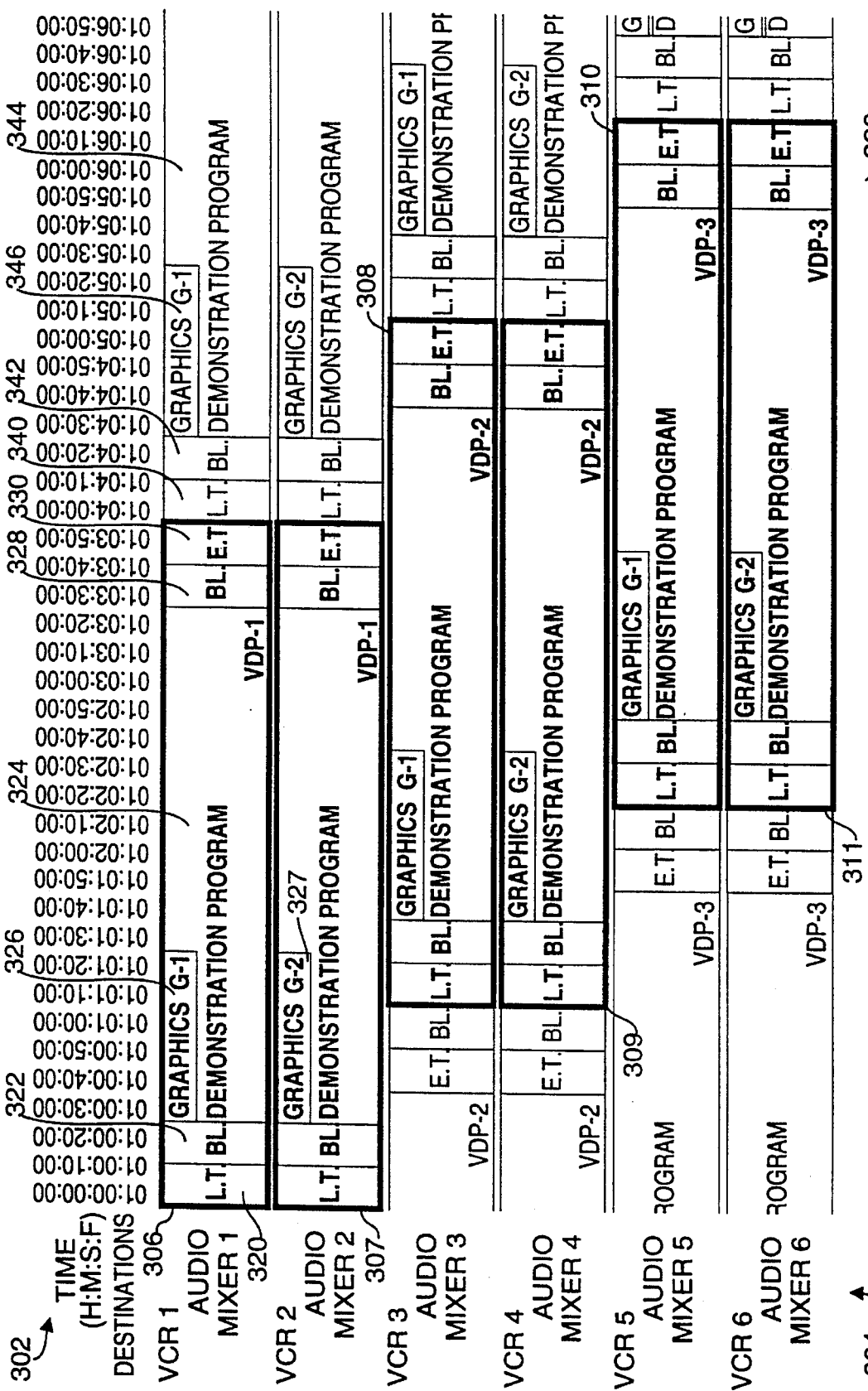
FIG. 3 is a time matrix diagram illustrating the production scheduling for a group of customized demonstration videotapes.

Referring now to FIG. 3, a time matrix 300 for production of the six demonstration videotapes is illustrated. At the top of the matrix 300, is shown a MIDI time code sequence 302, indicative of time and frames. In this regard, the time code sequence 302 is indicative of hours: minutes: seconds: frames. The time code sequence commences at 01:00:00:00 and terminates at 01:06:20:00, which time period is indicative of the total production time for producing the six videotapes. On the left margin a destination resource allocation is indicated generally at 304 that includes part of the videocassette recorders 14 and audio mixers 16. More particularly for this example, production requires the use of six videocassette recorders (VCR-1, VCR-2, VCR-3, VCR-4, VCR-5 and VCR-6) and six audio mixers (AM-1, AM-2, AM-3, AM-4, AM-5 and AM-6). The utilization of the allocated destination resources 304 during the MIDI time code sequence 302 is shown diagrammatically by a set of time sequence diagrams 306, 307, 308, 309, 310 and 311. In this example, VCR-1 and VCR-2 are utilized during the time period from 01:00:00:00 through 01:03:50:00 ; VCR-3 and VCR-4 are utilized during the time period from 01:01:10:00 through 01:05:10:00; and VCR-5 and VCR-6 are utilized during the time period from 01:02:20:00 through 01:06:20:00.

From the foregoing, it will be understood by those skilled in the art, that if a continuous production run was required producing a larger number of videotape, VCR-1 would be available at 01:04:00:00, VCR-2 would be available at 01:04:00:00; VCR-3 and VCR-4 would be available at 01:05:10:00, and VCR-5 and VCR-6 would be available at 01:06:20:00. Those skilled in the art will also understand that the production of each demonstration videotape requires a time period of three minutes and fifty seconds.

Referring now to the time sequence diagram 306, time sequence diagram 306 starts at time 01:00:00:00 and begins with a load tape time period 320 of about 10 seconds. The load tape time period 320 is indicative of a fixed time period for a tape loader (not shown) to load a given videotape cassette recorder, such as VCR-1, with a blank videotape (not shown). In this regard, a fixed load tape time is allocated for each videotape to be produced. The load tape time period 320 ends at time 01:00:10:00.

After the videotape has been loaded into VCR-1, recording commences with a black and silent lead-in segment indicated generally at 322. Lead-in 322 starts at 01:00:10:00 and ends at 01:00:20:00.; All videotapes start with a black and silent lead-in, such as the lead-in 322.

At 01:00:30 allocated resources, are routed to VCR-1. For this example, two allocated resources are routed to VCR-1, a video information segment 324 from a videodisc player VDP-1 and a graphic overlay segment 326 from a graphic overlay unit G-1. In this regard, the video information segment 324 and the graphic segment 326, such as a title for the demonstration tape, both start at 01:00:20:00. However, the graphic segment 326 terminates after 50 seconds at 01:01:20:00 while the video information segment terminates after two minutes and 50 seconds at 01:03:20.

When the video information segment 324 is terminated, a black-out with silence segment 328 ends the recorded information on the videotape. In this regard, all videotapes end with a black-out with silence segment, such as the segment 328. The black-out segment 328 is a ten second black-out that starts at 01:03:30:00 and terminates at 01:03:40:00.

Once the black-out segment 328 has completed, a tape ejector (not shown) ejects and removes the completed demonstration videotape from VCR-1. An eject tape time period, is allocated for tape ejection and removal indicated generally at 330. The eject tape time period 330 is about ten seconds. The above described sequence is then repeated starting with another load tape period 340, black and silent lead-in 342, video segment 344, and graphic segment 346, etc.

As best seen in FIG. 3, the time sequence diagram 307 is substantially the same as time sequence 306 except that a graphic segment 327 from another one of the graphic overlay units G-2 is routed to VCR-2. Graphic segment 327 has substantially the same time period as graphic segment 326. From the foregoing, it will be understood by those skilled in the art, that a single videodisc player, such as VDP-1 can service two videocassette recorders, such as VCR-1 and VCR-2 simultaneously. It will also be understood by those skilled in the art that although audio segments, such as audio 1 and audio 2 are prerecorded on the videodisc players 15, such audio segments are routed to destination videocassette recorders via the routing switcher 42 and the appropriate ones of the destination audio mixers 16.

As only two graphic overlay units are available for this production run, it will be understood that although videodisc players VDP-2 and VDP-3 and videocassette recorders VCR-3 and VCR-4 are available, such units cannot be activated until either one of the graphic overlay units G-1 or G-2 become available. Thus, for this example, both G-1 and G-2 will be available at 01:01:30:00. Based on the foregoing, the scheduling processor 13 would generate a production script that would instruct the tape loader to load videotapes into VCR-3 and VCR-4 at 01:01:10:00 and into VCR-5 and VCR-6 at 01:02:20:00 as this would allow the maximum utilization of the graphic overlay units G-1 and G-2.

Time diagrams 308–311 are substantially similar to time diagrams 306–307 except 1) diagrams 308–309 utilize the videodisc player VDP-2 and audio mixers AM-3 and AM-4 for video input and audio mixing; and 2) diagrams 310–311 utilize the videodisc player VDP-3 and audio mixer AM-5 and AM-6.

As another example, a production run B may require the production of six (6) or more customized music videocassette tapes, each videotape having from four to six customer selected music videos selectable from a music video group of 24 selections, for example. Such a production utilizes twelve (12) videodisc players, where videodisc players VDP-1, VDP-5 and VDP-9 have music video vignettes or segments 1-6, videodisc players VDP-2, VDP-6 and VDP-10 have music video vignettes or segments 7–12, videodisc players VDP-3, VDP-7 and VDP-11 have music video vignettes or segments 13–18, videodisc players VDP-4, VDP-8 and VDP-12 have music video vignettes or segments 19–24, and two (2) graphic overlay units and six (6) audio mixers. Again, for the purpose of this example, the allocated video, graphic and audio resources are assumed to be the only resources available.

Figure 4:
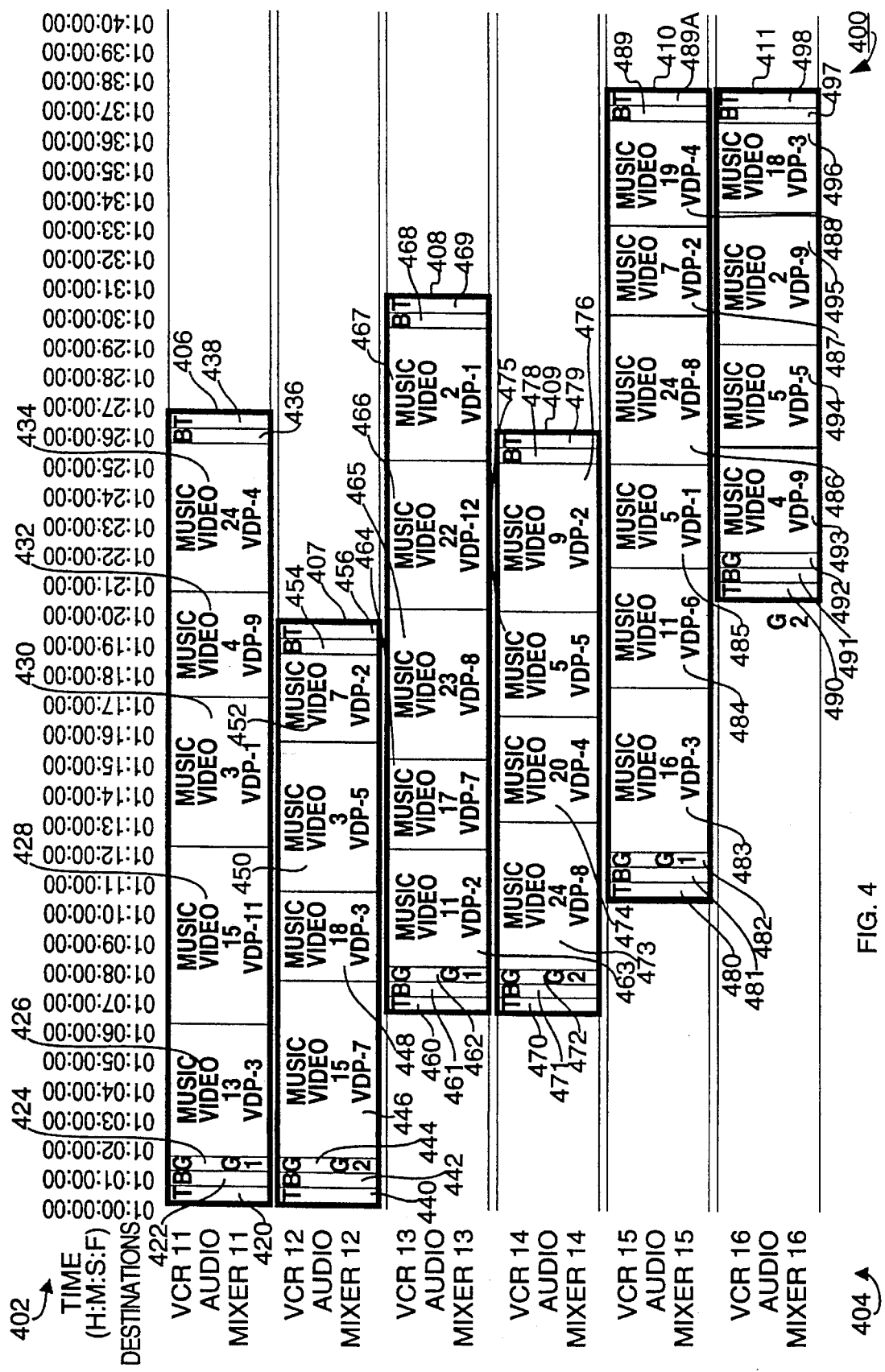
FIG. 4 is a time matrix diagram illustrating the production scheduling for a group of customized music videotapes.

Referring now to FIG. 4, a time matrix diagram 400 for production of six customized music videotapes is illustrated. At the top of the matrix 400; is shown a MIDI time code sequence 402. The time code sequence is expressed as $A_1:B_1:C_1: D_1$ where $A_1$ is indicative of hours; $B_1$ is indicative of minutes; $C_1$ is indicative of seconds; and $D_1$ is indicative of frames. The time code sequence 402 commences at 01:00:00:00 and terminates at 01:38:00:00, which time period is indicative of the total production time for producing the six (6) customized video tapes.

On the left margin a destination resource allocation is indicated generally at 404 that includes part of the videocassette recorders 14 and audio mixers 16. This allocation is similar to the previous example, except VCR-11 through VCR-16 and AM-11 through AM-16 are allocated.

The utilization of the allocated destination resources 404 is shown diagrammatically by a set of time sequence diagrams 406, 407, 408, 409, 410 and 411. In this example, VCR-11 is utilized during the time period from 01:00:00:00 through 01:27:00:00; VCR-12 is utilized during the time period from 01:00:00:00 through 01:20:00:00; VCR-13 from 01:07:10:00 through 01:31:00:00; VCR-14 from 01:07:10:00 through 01:27:00:00; VCR-15 from 01:11:00:00 through 01:38:00:00; and VCR-16 from 01:21:00:00 through 01:38:00:00.

From the foregoing, it will be understood by those skilled in the art, that if a continuation production run was required producing a large number of customized videotapes, maximum efficiency would be limited absolutely by the availability of the videocassette recorders 14.

Referring now to the time sequence diagram 406, time sequence diagram 406 starts at time 01:00:00:00 and begins with a thirty (30) second tape load time period 420 followed by a thirty (30) second black and silent lead-in segment 422. All videotape productions start with similar load periods and black lead-in periods.

At 01:01:00:00 allocated resource G-1 is routed to VCR-11 to permit a graphic information segment 424 to be recorded during the period from 01:01:00:00 through 01:02:00:00.

When the graphic segment 424 is completed, a music video segment 426 indicative of music video number thirteen, from videodisc player VDP-3 is routed to VCR-11 and AM-11 respectively for recording by VCR-11. Music video segment 426 commences at 01:02:00:00 and terminates at 01:06:00:00.

While music video segment 426 is being recorded, videodisc player VDP-11 is queued to a music video segment 428 indicative of music video number fifteen. Music video segment 428 is then routed from VDP-11 to VCR-11 and AM-11 respectively at 01:06:00:00 commencing immediately after the termination of segment 426.

The above described sequence of queuing, routing, and terminating is repeated for a group of three additional music video segments, a music video segment 430, indicative of music video number three from VDP-1; a music video segment 432, indicative of music video number four from VDP-9 and a music video segment 434, indicative of music video number twenty-four from VDP-4.

At the completion of segment 434, a black-out with silence segment 436 ends the recorded information on the videotape. In this regard, all videotapes end with a black-out with silence segment, such as segment 436. The black-out segment 436 is a thirty (30) second black-out that starts at 01:26:00:00 and terminates at 01:26:30:00.

Once the black out segment 436 has completed, a tape ejector (not shown), causes the produced videotape to be ejected. A ten second eject tape period, indicated generally at 438 is provided for tape ejection and removal. After the tape is ejected, VCR-11 may be utilized to create another customized music videotape.

As best seen in FIG. 4, the time sequence diagram 407 commences at 01:00:00:00 with a load tape period 440 which is followed by a black lead-in with silence information segment 442. The black lead-in with silence segment 442 commences at 01:01:00:00 and ends at 01:01:30:00.

When segment 442 has been recorded, a graphic segment 444 from another one of the graphic overlay units G2 is routed to VCR-12. Graphic segment 444 has substantially the same time period as graphic segment 424.

While graphic segment 444 is being recorded by VCR-12, a music video segment 446 from VDP-7 is queued-up for recording. In this regard, when segment 444 is completed, the music video segment 446 is routed to VCR-12 starting at 01:02:00:00.

As segment 446 is being recorded, another music video segment 448 from VDP-3 is queued-up for recording by VCR-12. Segment 448 commences at 01:08:00:00 when segment 446 is completed. The process of queuing, routing, recording, terminating, recording is repeated for an additional two music segments, a segment 450 from VDP-5 and a segment 452 from VDP-2.

At the completion of recording segment 452, a black-out with silence segment 454 completes the recorded information on the videotape in VCR-12. In this regard, at 01:19:30:00 a thirty second tape eject period 456 starts permitting a tape ejector (not shown) to eject the tape in VCR-12.

Time diagrams 408–411 are similar to time diagrams 406–407 except for the allocation of different resources and destinations. In this regard, VCR-13 and AM-13 are associated with diagram 408, while VCR-14 and AM-14 are associated with diagram 409, VCR-15 and AM-14 are associated with diagram 410 and VCR-16 and AM-16 are associated with diagram 411. Tables IA–IC illustrate the segments for diagrams 408 and 409 as well as diagrams 410 and 411.

TABLE IA

| DIAGRAM NO. | LOAD TAPE | SEGMENTS | | |
|---|---|---|---|---|
| 408 | a tape load period 460 | a black lead-in with silence segment 461 | a graphic segment 462 | a music video segment 463 |
| 409 | a tape load period 470 | a black lead-in with silence segment 471 | a graphic segment 472 | a music video segment 473 |
| 410 | a tape load period 480 | a black lead-in with silence segment 481 | a graphic segment 482 | a music video segment 483 |
| 411 | a tape load period 490 | a black lead-in with silence segment 491 | a graphic segment 492 | a music video segment 493 |

TABLE IB

| DIAGRAM NO. | SEGMENTS | | | | |
|---|---|---|---|---|---|
| 408 | a music video segment 464 | a music video segment 465 | a music video segment 466 | | |
| 409 | a music video segment 474 | a music video segment 475 | a music video segment 476 | | |
| 410 | a music video segment 484 | a music video segment 485 | a music video segment 486 | a music video segment 487 | a music video segment 488 |
| 411 | a music video segment 494 | a music video segment 495 | a music video segment 496 | | |

TABLE IC

| DIAGRAM NO. | SEGMENTS | | TAPE EJECT |
|---|---|---|---|
| 408 | a music video segment 467 | a black-out with silence segment 468 | a tape eject period 469 |
| 409 | | a black-out with silence segment 478 | a tape eject period 479 |
| 410 | | a black-out with silence segment 489 | a tape eject period 489A |
| 411 | | a black-out with silence segment 497 | a tape eject period 498 |

In the music video example, it will be understood by those skilled in the art that one of the graphic units G-1 or G-2 is required for producing each tape. However, unlike the first example, tapes cannot be produced in sequence when such graphic units become available. Instead, the scheduling processor 13 generates a script that permits the videodisc players VDP-1 through VDP-12 to be shared, allowing sufficient time for individual music video segments, such as the segment 426, to be queued, routed, recorded and terminated without scheduling the use of any one videodisc player by any two or more videocassette recorders simultaneously and without scheduling the use of any videodisc player in a sequence where sufficient time is unavailable for queuing of required segments.

As a final example, a production run C requires the production of six (6) or more customized sales videocassette tapes, each videotape having a customized testimonial video segment with a narration. Such a production utilizes five (5) videodisc players, two (2) graphic overlay units, six (6) audio mixers, and six (6) videocassette recorders. Again, for the purpose of this example, the allocated video, graphic and audio resources are assumed to be the only resources available.

Figure 5:
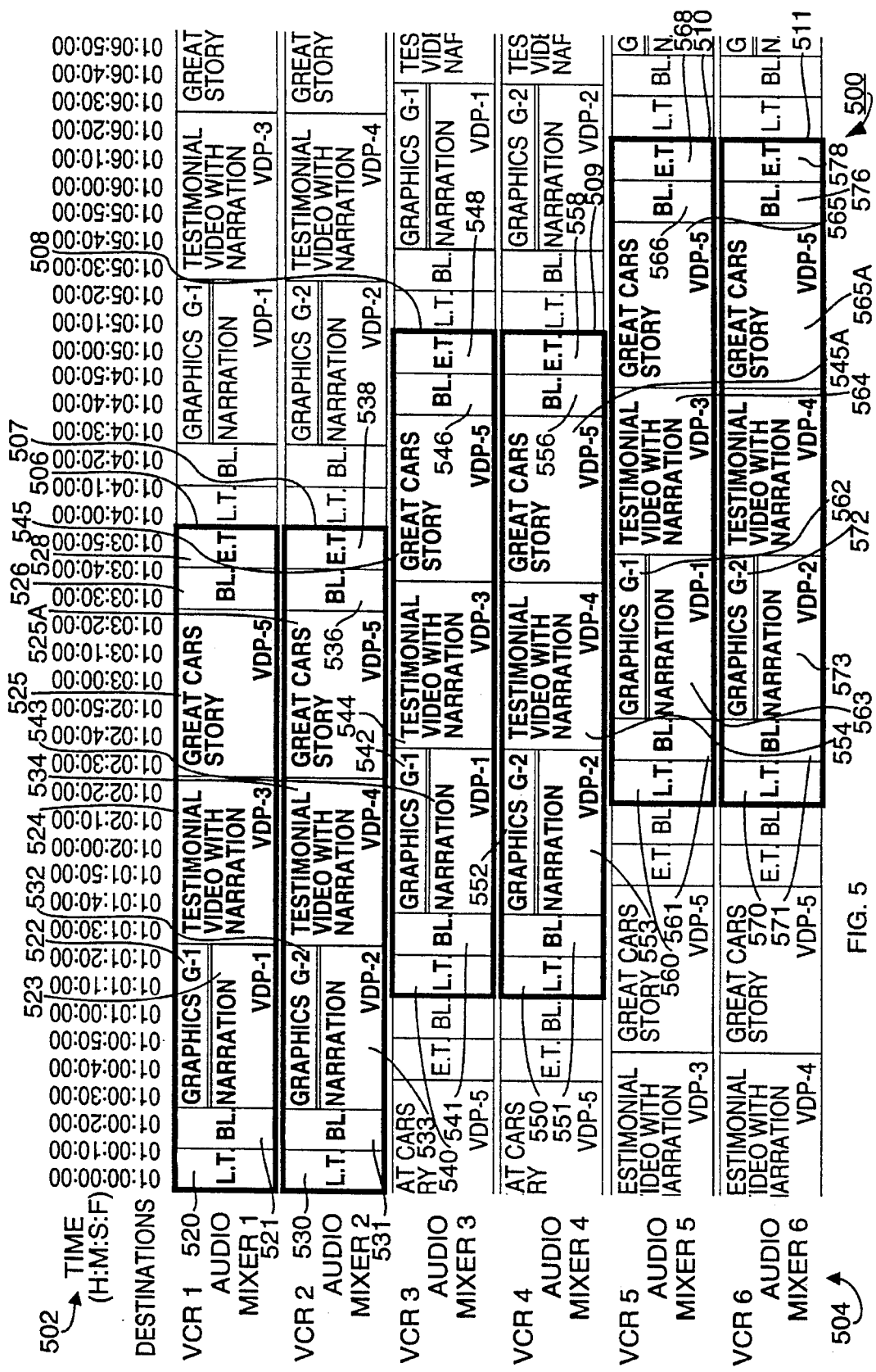
FIG. 5 is a time matrix diagram illustrating the production scheduling for a group of customized sales presentation videotapes.

Referring now to FIG. 5, a time matrix 500 for production of six customized sales presentation videotapes is illustrated. At the top of the matrix 500, is shown a MIDI time code sequence 502. Sequence 502 is similar to sequence 402 and is indicative of time in hours, minutes, seconds and frames.

On the left margin a destination resource allocation is indicated generally at 504 that includes part of the videocassette recorders 14 and audio mixers 16. This allocation is similar to the first example with the allocation of VCR-1 to VCR-6 and AM-1 to AM-6. The utilization for the allocated destination resources 504 is shown diagrammatically by a set of time sequence diagrams 506–511.

Referring now to the time sequence diagram 506, time sequence diagram 506 starts at time 01:00:00:00 and begins with a thirty (30) second tape load time period 520 followed by a thirty second black and silent lead-in segment 521. All videotape productions in this example start with similar load and lead-in segments. In this regard, Table II shows the load and lead-in segments for each of the diagrams 506–511.

TABLE II

| Diagram No. | Load Tape | SEGMENTS Lead-in Segment | Lead-Out | Eject Tape |
|---|---|---|---|---|
| 506 | 520 | 521 | 526 | 528 |
| 507 | 530 | 531 | 536 | 538 |
| 508 | 540 | 541 | 546 | 548 |
| 509 | 550 | 551 | 556 | 558 |
| 510 | 560 | 561 | 566 | 568 |
| 511 | 570 | 571 | 576 | 578 |

As in the previous examples, each of the time sequence diagrams such as diagram 506, terminate with a black-out with silence segment, such as a segment 526 followed by a thirty (30) second tape eject period, such as a period 528. Table II also shows the lead-out and eject segments for each of the diagrams 506–511.

As best seen in FIG. 5, a graphic segment 522 and a narration segment 523 is recorded at time 01:00:30:00 for diagram 506. The graphic segment is routed from graphic overlay unit G-1 while the narration segment 523 is routed from VDP-1.

While the narration segment is recording, a testimonial video, with a narration segment 524 is queued-up from VDP-3. In this regard, when the narration segment 523 is completed at 01:01:20:00, the segment 524 is recorded.

In a similar manner, while segment 524 is recording a great cars story segment 525 is queued so that it may be routed and recorded at the completion of segment 524. Once segment 525 has been recorded, the black-out segment 526 and eject period 528 immediately follow.

Time diagram 507 has a time base similar to time diagram 506. In this regard, both diagrams 506 and 507 commence at 01:00:00:00 and terminate at 01:04:00:00. Time diagram 507 illustrates that a different graphic segment 532 is recorded. Also a different narration segment 533, and a different testimonial video 534 are retrieved from VDP-2 and VDP-4 respectively, while the same great cars story segment 525A is utilized in both diagrams from VDP-5.

Diagrams 508–509 and 510–511 are substantially similar to diagrams 506–507 respectively except for base time periods. In this regard, those skilled in the art will understand that diagrams 508–509 as well as 510–511 must be scheduled so that the graphic overlay segments 522 and 532, and narration segments 523, 533 do not require simultaneous access and can be properly queued prior to being routed to the programmed designation resources.

Diagrams 508–509 and 510–511 are substantially similar to diagrams 506–507 respectively, except for base time periods. In this regard, the information segments from the graphic overlay units G-1 and G-2, the testimonial segments from the videodisc players VDP-3 and VDP-4 as well as the great cars story segment from the videodisc player VDP-5 are substantially identical for diagrams 506–507 relative to diagrams 508–509 and 510–511 respectively. Table III shows the segment relations between the above-mentioned time sequence diagrams 506–511.

TABLE III

| DIAGRAMS | SEGMENTS | | | | |
|---|---|---|---|---|---|
| 506 | 522 523 | 524 | 525 | | |
| 507 | 532 533 | 534 | 525A | | |
| 508 | | 542 543 | 544 | 545 | |
| 509 | | 552 553 | 554 | 545A | |
| 510 | | | | 562 563 | 564 | 565 |
| 511 | | | | 572 573 | 574 | 565A |

B. DETAILED HARDWARE DESCRIPTION

Considering now the system 10 in greater detail with reference to FIG. 1, the group 14 of videocassette recorders are coupled to the videocassette server control 28 via a bidirectional remote control unit 80. The control unit 80 sends status information to the VCR server control 28 and controls the operation of the group 14 of videocassette recorders. The control 80 is manufactured and sold by SONY Corporation. The control unit 80 is coupled to an audio/video monitor 82 that enables a user (not shown) to preview audio/video productions produced on individual ones of the videocassette recorders, such as the videocassette recorder 62. The group 16 of audio mixers is controlled by the VCR server control 28 using MIDI.

As best seen in FIG. 1, the system 10 also includes a synchronization generator 77 that generates a video sync signal carried on a conductor 78 for helping to facilitate synchronization of the video portion of the system 10. In this regard, the video sync signal is coupled to each of the videodisc players, such as the videodisc players 71 and 72 via the conductor 78 as well as the routing switcher 42 via a sync input port 43 which is connected to the sync generator 77 via the conductor 78.

The synchronization generator 77 also produces a black-out signal carried on a conductor 79. The black-out signal is coupled to a video input port 44 of the routing switcher 42 for enabling black-out with silence information segments, such as the segment 322 (FIG. 3), to be recorded on certain designated videocassette recorders in group 14.

In order to synchronize the MIDI time code to the frame timing of the video in the system the synchronization generator 77 is also coupled to the time code generator 20 via a conductor 21. In this regard, the time code generator 20 includes a video input port 85 coupled to the conductor 21.

Considering now the group 15 of videodisc players in greater detail with reference to FIG. 1, the group 15 is connected to the routing switcher 42 by a corresponding group 67 of video processing amplifiers (PA-1 to PA-8), such as a video processing amplifier 68 and a video processing amplifier 69. In this regard, each video processing amplifier, such as the video processing amplifier 68, includes a video input port and video output port, such as a video input port 95 and a video output port 97. The video input ports are coupled to associated ones of the videodisc players, while the video output ports are coupled to associated video input ports of the routing switcher 42. For example, a video output port 94 of videodisc player 71 is connected to a video input port 95 of video processing amplifier 68 by a conductor 96. Also, a video output port 97 of the video processing amplifier 68 is connected by a conductor 98 to a video input port 45 of the routing switcher 42. As each of the remaining videodisc players in group 15 are coupled to the routing switcher 42 in a similar manner, such interconnections will not be described in greater detail.

As best seen in FIG. 1, each videodisc player in group 15, such as the videodisc player 71, includes a synchronization loop input port, such as a loop input port 47. The sync loop input ports are interconnected to one another by conductor 78 that carries the video synchronization signal.

Each videodisc player in group 15, such as the videodisc player 71, also includes a serial port, such as a serial port 48 that is connected to an associated individual serial port in a group 49 of serial ports of the videodisc server control 24. In this regard, the videodisc server control 24 transmits control signals and receives status information via the serial port group 49 to each of the videodisc players in group 15.

In order for the videodisc server control 24 to receive timing signals from the MIDI distributor 22, the videodisc server control 24 includes a MIDI input port such as a MIDI input port 50, coupled to an associated output port in a group 51 of MIDI timing output ports of the MIDI distributor 22.

For the purpose of coupling the output timing signals from the time code generator 20 to the MIDI distributor 22 a MIDI output port 52 of the time code generator 20 is connected to a MIDI input port 53 of the MIDI distributor 22 by a conductor 54.

Considering now the group 17 of graphic servers, such as the graphic servers 74 and 75, each of the graphic servers is substantially similar so only graphic server 74 will be described hereinafter in greater detail.

Graphic server 74 includes a video input port 55A, a video output port 55B, a MIDI input port 56A, a MIDI output port 56B and a LAN port 57. The video input port 55A is connected via a conductor in a conductor group 55C to a video output port 58 of the routing switcher 42, while the video output port 55B is connected via a conductor 55D to a video input port 59 of the routing switcher 42. In this regard, the graphic server 74 is connected between the video output and video input ports, 58 and 59 respectively, in order to enable graphic server 74 to produce a graphic record signal for causing a videocassette recorder, such as the videocassette recorder 61 to record a graphic information segment, such as the segment 326 (FIG. 3).

The MIDI input port 56A is connected to an appropriate MIDI output port of group 51 via a conductor 60, while the MIDI output port 56B is connected to a MIDI port of another graphic server, such as the graphic server 75 via a conductor 86. From the foregoing, it will be understood graphic servers G1 to G4 of group 17 are connected in series so that the output timing signal from the MIDI distributor 22 is coupled to each respective graphic server in group 17.

C. SYSTEM SOFTWARE

Figure 8:
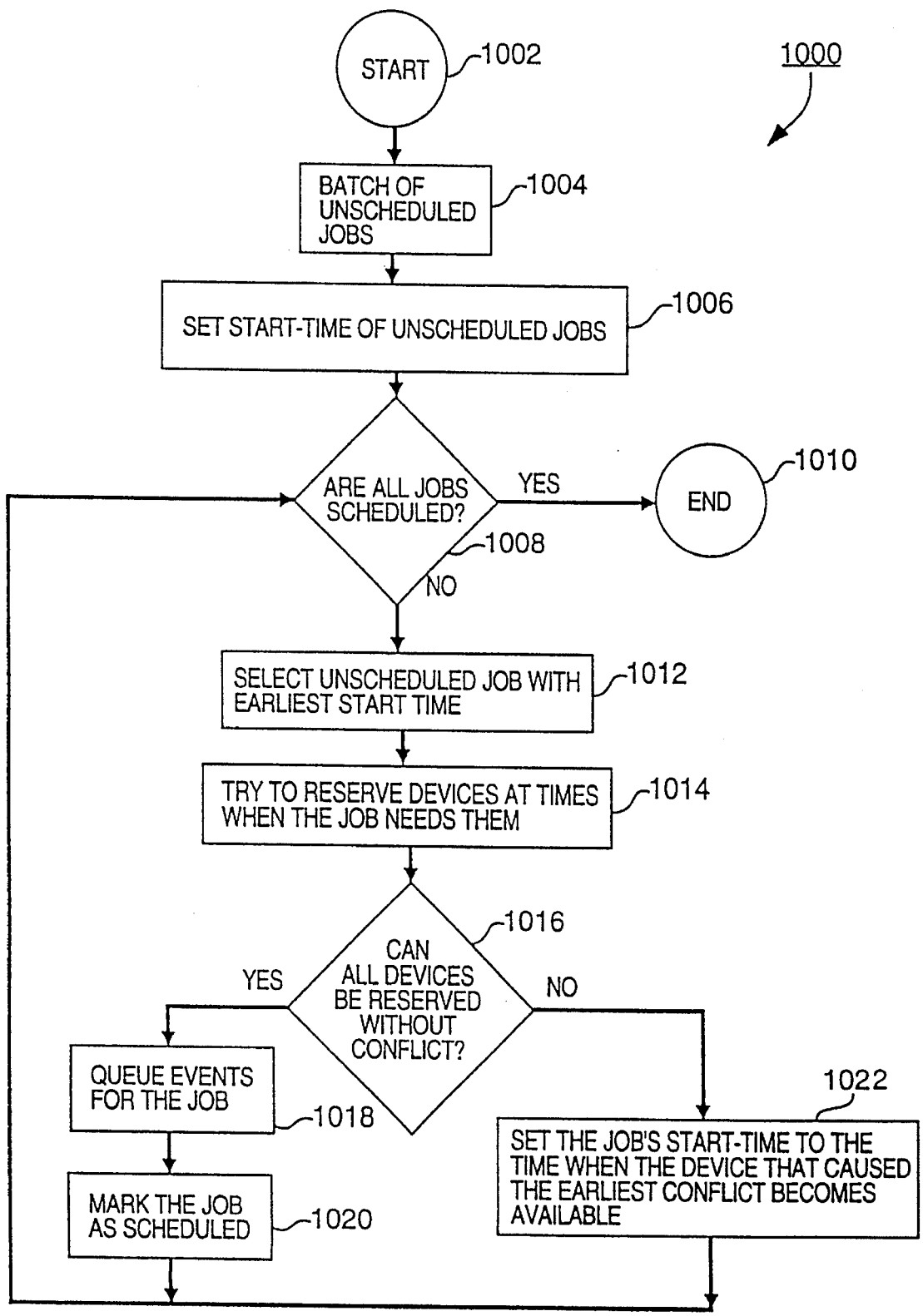
FIG. 8 is a flow diagram for a schedule program to time schedule the destination and source resources of FIG. 1.

Considering now the scheduling software with reference to FIG. 8 a program "SCHEDULE" 1000 provides a general example of how the system 10 schedules the production of a group of videotapes. It should be understood that each job processed by SCHEDULE 1000, has an associated video report file, as described hereinafter.

The program SCHEDULE starts at 1002 and proceeds to 1004 where a batch of unscheduled jobs is retrieved from the file server 32. A "job" refers to the process for the production of a certain custom videotape. A job has various information attributes, such as a start time and a scheduled/unscheduled flag, and these attributes are maintained by the system software. A "batch" refers to a group of jobs. This term is used in the description of scheduling. Scheduling is only one part of the production process.

The program proceeds from instruction 1004 to a command instruction 1006 and sets the start time of all the retrieved unscheduled jobs to a time after the current system time for the system 10 such that the first job scheduled will begin some time after the task of scheduling is complete.

After setting the start time, the program proceeds to a decision box 1008 to determine whether all the productions or jobs have been scheduled. If all productions have been scheduled, the program goes to a command 1010 and terminates the SCHEDULE program 1000. If all productions have not been scheduled, the program proceeds to a command box instruction 1012 and selects an unscheduled tape production job having the earliest assigned start time. The program then advances to a command box instruction 1014.

At command 1014 the program attempts to reserve individual resource devices in groups 14–17 at a time when the production job requires use of such resources. The program then goes to a decision box 1016 to determine whether all of the required resource devices in groups 14–17 can be reserved without conflict between previously scheduled production jobs.

If the required resources can be reserved, the program proceeds to a command box instruction 1018 and queues the scheduled events for the production task. The events are queued by sending command messages to the various servers 17, 24, 16 and 28 over the LAN. The program then goes to instruction 1020 and sets a flag indication that the production job is scheduled. The program then returns to decision box 1008 and proceeds as previously described.

If the required resources cannot be reserved the program branches to a command instruction box 1022 and sets the job's start time to a time when the device that caused the earliest conflict becomes available. The program then returns to decision box 1008 and proceeds as described previously.

From the foregoing, it will be understood by those skilled in the art that the SCHEDULE program 1000 is an iterative program that continues in the above described program loop until all jobs have been scheduled without resource conflict with any previously scheduled job.

It should also be understood that the scheduler 13 communicates with the servers on the system. FIG. 7G shows allocation messages that the client sends to servers for the typical job in the example to be described hereinafter, and FIG. 7I shows program code for the timed event messages.

Considering now the process for producing a typical script relative to FIG. 7A–7J, FIG. 7A illustrates a typical questionnaire 700 used for gathering client information. Information on the questionnaire 700 is read by means (not shown) and stored in a database memory of the data preprocessor 36 as raw data.

FIG. 7B illustrates a typical set of raw data 702 that is generated from a client questionnaire such as the questionnaire 700 (FIG. 7A). Such raw data 702 and 201 in FIG. 2 is stored in the data base memory of the data pre-processor 36 for future use.

When a production requires the raw data 702 to be processed, the data pre-processor 36 retrieves the raw data 702 and produces a set of processed data, indicated generally at 704 and 203 in FIG. 2. The raw data 702 is processed by the data-preprocessor 36 (FIG. 2) to generate a set of data to be used to produce a videotape. The key function of the data-preprocessor 36 is to choose information using the raw data as selection criteria. This information is then merged with the raw data to produce a set of processed data 704 (FIG. 7C).

After the processed data 704 has been produced, a video report description, such as the video report description 205 (FIG. 2) is retrieved from the data pre-processor and used with the processed data 704 by the report interpreter 207 (FIG. 2) to produce a video report 706 as shown in FIGS. 7D, 7E and 7F. The video report description 205 describes the general form that a video is to take. The processed data coupled with the video report description 205 provides the information necessary to generate a customized video. The report interpreter 207 turns this information into a video report file (items 706A, 706B, FIG. 7D). A first part 706A of the video report 706 is illustrated in FIG. 7E and a final part 706B of the video report 706 is illustrated in FIG. 7F and 209 in FIG. 2.

The video report file 209 is a program that will be presented to the scheduler. The syntax of the program's language should be understood by those skilled in the art. This program describes exactly the contents of the videotape to be generated. How the videotape gets generated is only partially described by the program in two ways: first, times for events to occur, such as loading tapes into a VCR, playing a certain segment on a videodisc player, etc., are described using offsets from an unknown start time. Second, the resources, such as VCRs, titlers (i.e. graphic overlay devices), videodisc players, etc., to be used at given time offsets are described by type, not by actual identification.

Later in the process, during scheduling, the event times are instantiated with real times and the resource allocations are instantiated with real resources.

To describe this last concept precisely, refer to FIG. 1. A program will always request a VCR, generally indicated by item 14. The scheduler will read a program and select a VCR, such as 61, for use by the job.

When the video report 706 is produced the report 706 is stored in the memory of the scheduling processor 13. The scheduling processor 13 then engages in a dialogue, such as a dialogue 708 illustrated in FIG. 7G or the event dialogue 12 (FIG. 2) with the individual servers in the system 10. The dialogue 708 establishes what specific audio/video resources will be used to make a given videotape such as the videotape 19.

Once the resources have been allocated or scheduled via the program SCHEDULE 1000, the schedule processor 13 transmits to the system servers a script 710 (FIG. 7H) that includes groups of tape production events, such as a group 710A of tape production events and a group 710B of tape production events.

Referring now to FIGS. 10–17 an illustrated example of compiling a print report, such as the print report 227 (FIG. 2 and FIG. 16), a label 219 (FIG. 2 and FIG. 15), and a videotape report 19 (FIG. 2 and FIG. 17) will be described.

As best seen in FIG. 7A a machine readable questionnaire 700 contains a group 1100 of customer information, such as the name of the customer, and the address of the customer. The questionnaire 700 also contains a group 1102 of personal information, such as the number of passengers the customer usually transports in his or her car, the type of activities the customer uses his or her car for transportation purposes, the age of the customer, and whether the customer is a male or female.

From the above described raw data, the system 10 processes the raw data and rearranges the customer information as processed data. This processed data is then used to prepare the print report 227, label 219, and videotape report 19. In this regard, the video report description 205, label description 213 and print report description 221 are each combined with the processed data via the report interpreter 207 to prepare the print report file 223, the label file 215, and the video report file 209.

Figure 10:
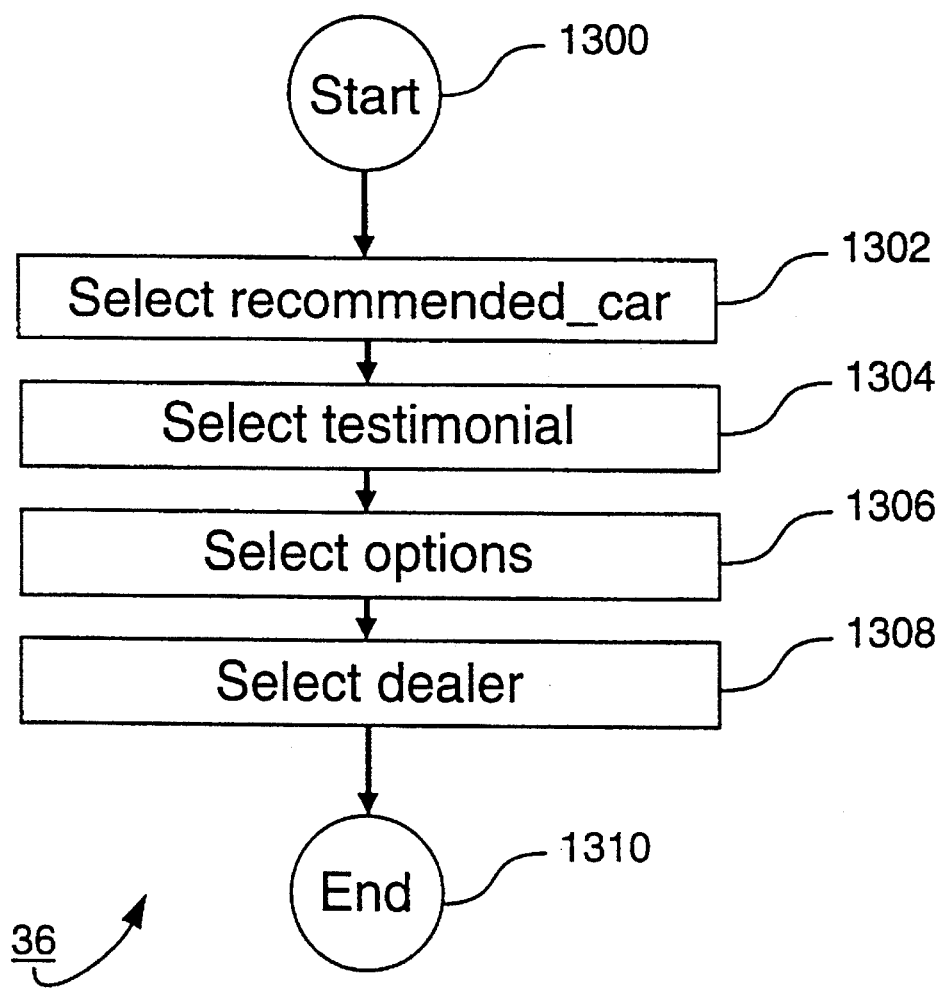
FIGS. 10–14 are simplified flow chart examples of how the raw data of FIGS. 7A–J is processed.
Figure 11:
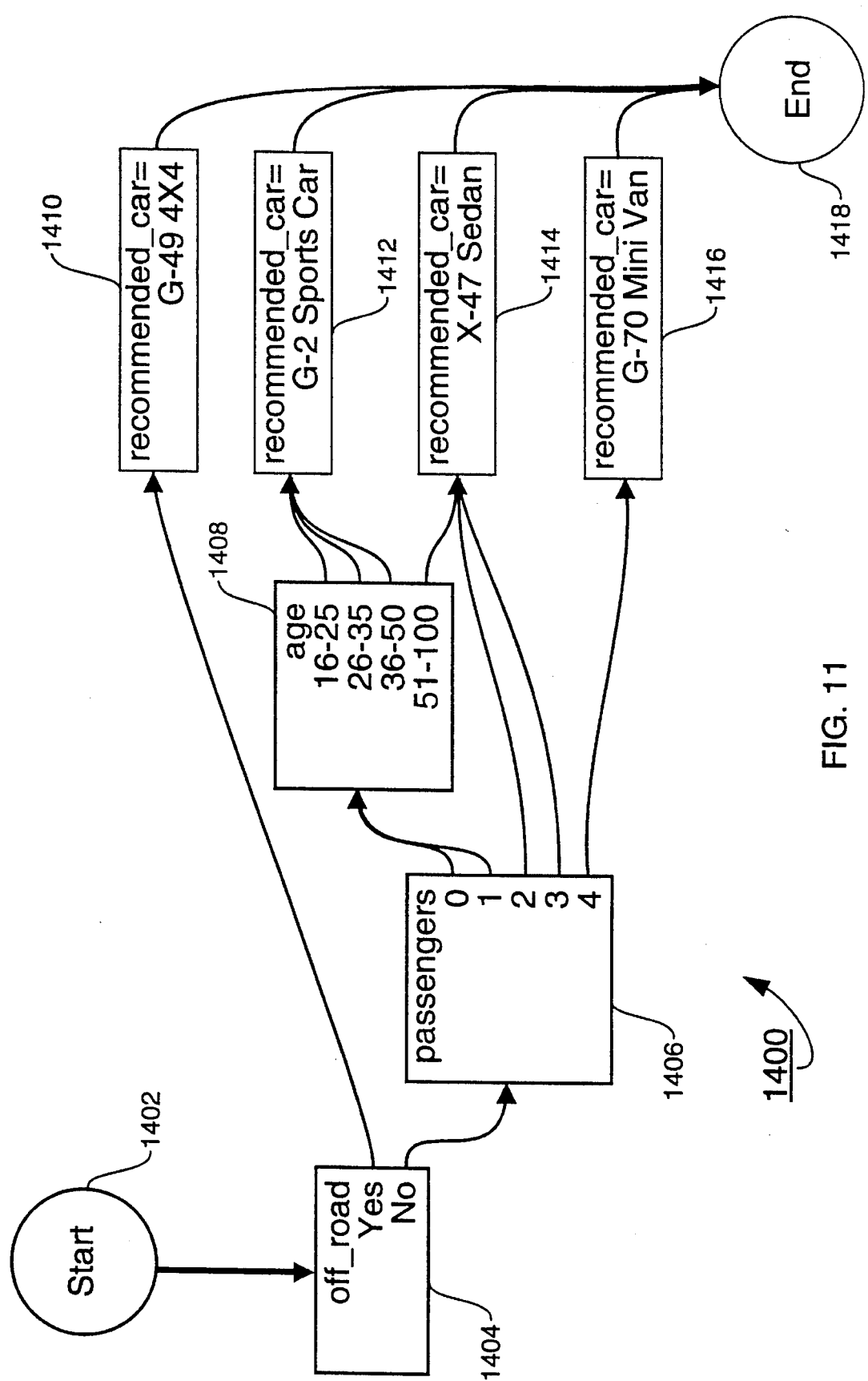
Figure 12:
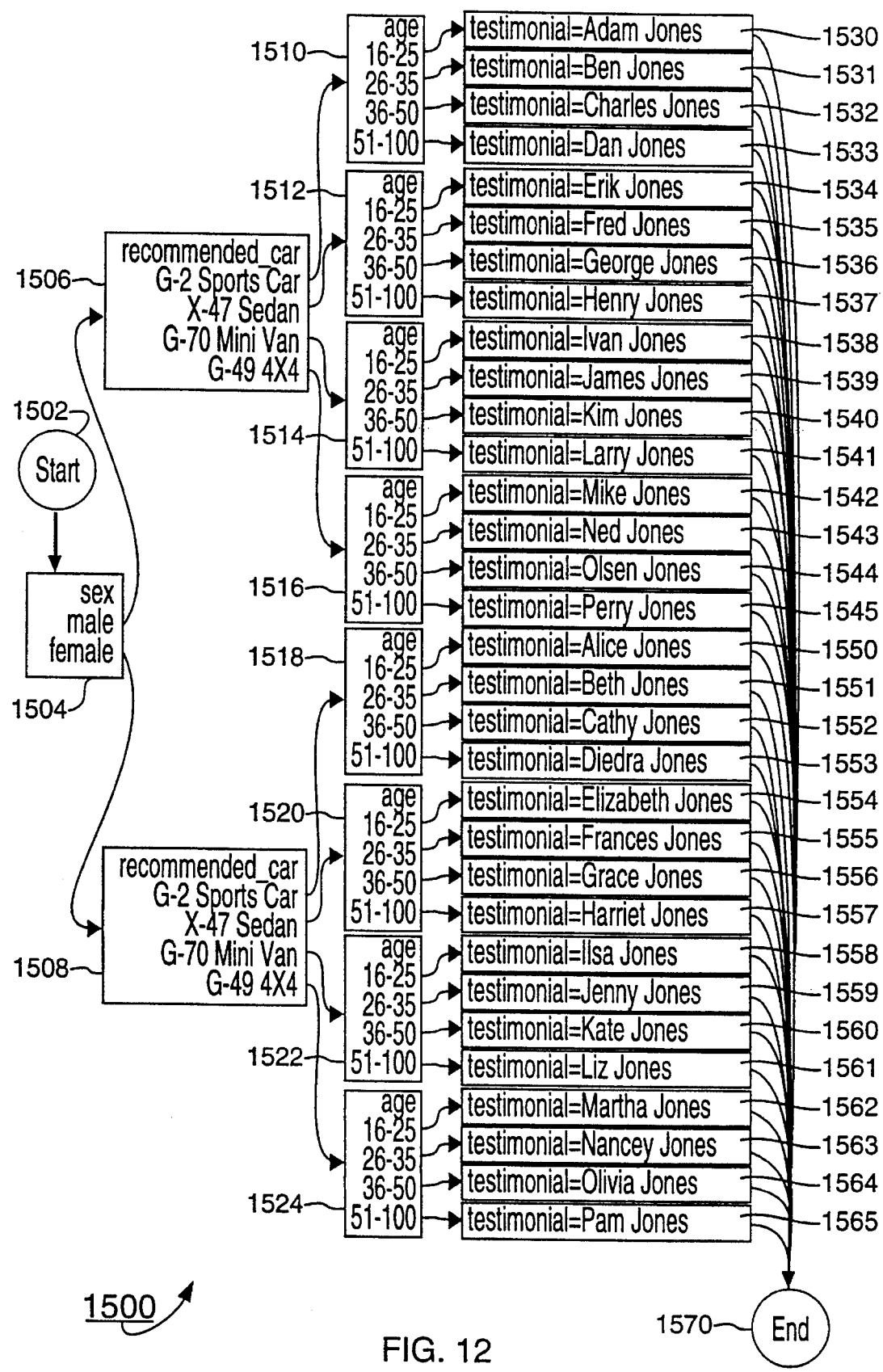
Figure 13:
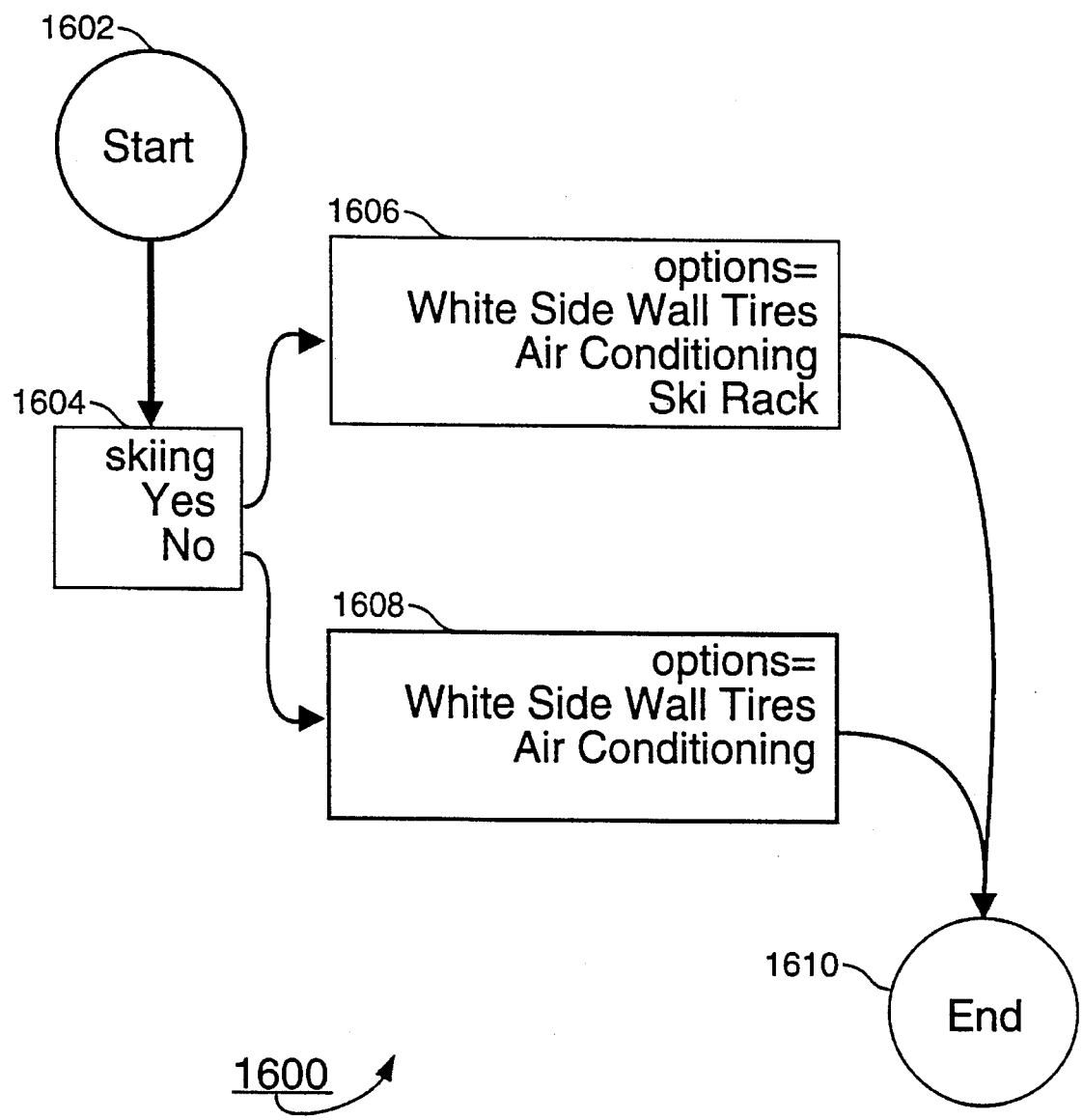
Figure 14:
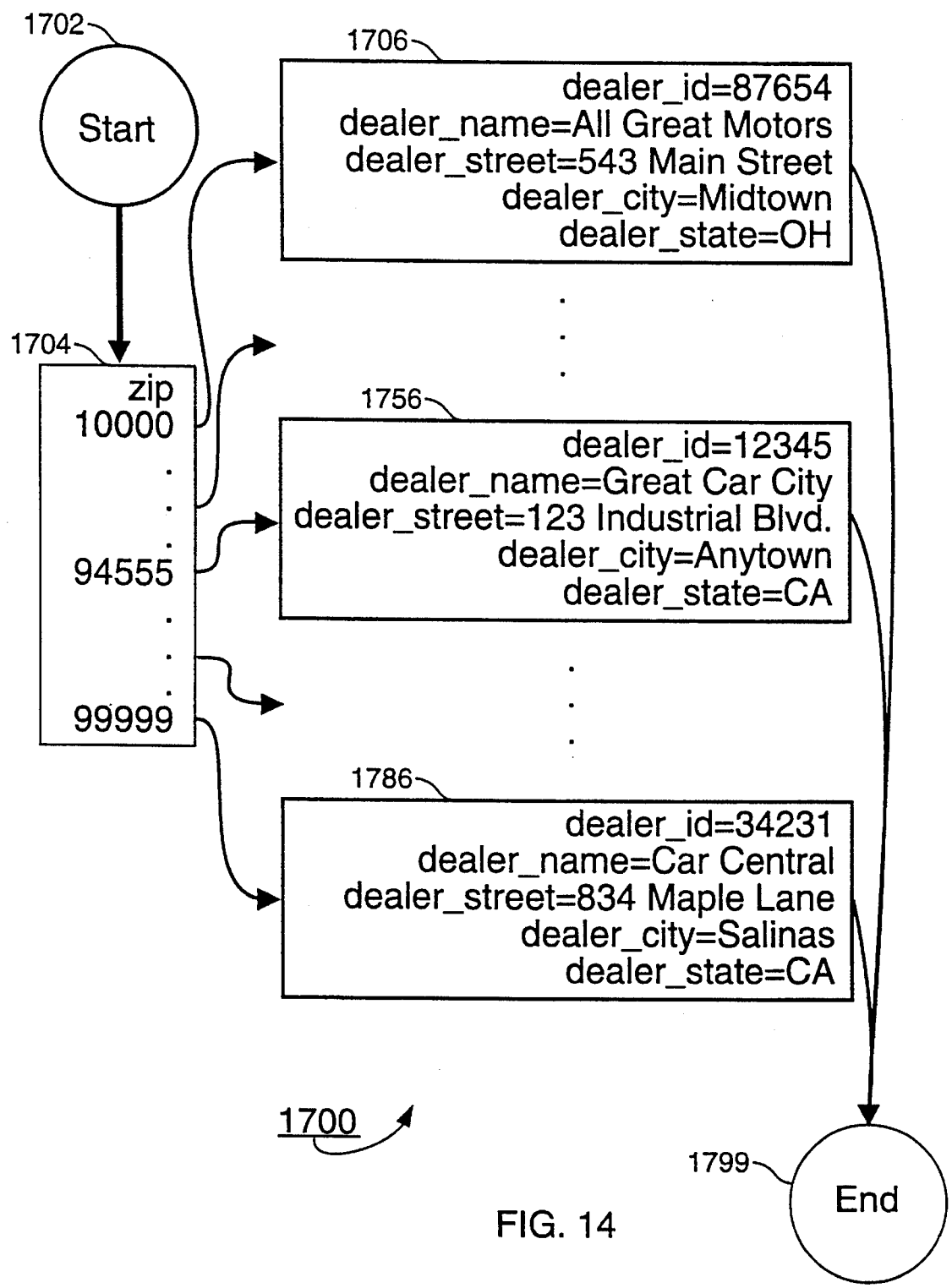

In this regard, the data pre-processor 36 (FIG. 10) starts at 1300 and proceeds to an instruction box 1302 that calls a SELECT RECOMMENDED CAR subroutine 1400 (FIG. 11). After execution of the subroutine 1400 the program proceeds to an instruction box 1304 that calls a SELECT TESTIMONIAL subroutine 1500 (FIG. 12). When subroutine 1500 has been completed, the program then goes to an instruction box 1306 that calls a SELECT OPTIONS subroutine 1600 (FIG. 13). Once the subroutine 1600 is completed, the program advances to an instruction box 1308 that calls a SELECT DEALER subroutine 1700 (FIG. 14). After the completion of subroutine 1700 the processed data file 203 is created. The data in the processed data file 203 is then processed by the report interpreter 207 using the print description file 221, the label description file 213 and the video report description 205 to produce the print report file 223, the label file 215 and the video report file 209. When the files 209, 215 and 223 have been produced, the report interpreter program 207 ends. The print report file 223, the label file 215 and the video report file 209 are then used to produce the label 217, print report 227 and videotape report 211 respectively by means of the label printer, the report printer and the scheduler 13 under the management of the client/server control 13.

Considering now the SELECT RECOMMENDED CAR subroutine 1400 in greater detail with reference to FIG. 11, the subroutine 1400 starts at a start instruction box 1402 and proceeds to a decision box 1404. At decision box 1404 a determination is made whether a selected customer, such as John Jones, uses his car for off-road activities.

If the selected customer utilizes a vehicle for off-road activities, the program goes to an instruction box 1410. If the selected customer does not utilize a vehicle for off-road activities, the program advances to a decision box 1406.

At instruction box 1410, a recommended car is selected for the customer. In this example, a G-49 4×4 vehicle is selected and stored in processed data 203. The program then goes to an end instruction box 1418 which returns to the interpreter program at instruction 1304, that will be described in greater detail.

At decision box 1406 a determination is made whether the selected customer carries 0, 1, 2, 3 or 4 passengers in his or her car. If the selected customer carries 0 or 1 passengers, the program goes to a decision box 1408. If the customer carries 2 or 3 passengers, the program proceeds to a recommendation instruction box 1414. If the customer carries 4 passengers, the program advances to a recommendation instruction box 1416.

Instruction box 1412 causes a recommended G-2 sports car to be selected for the customer. After storing the designated selection, the program proceeds to the end instruction 1418 that returns the program to the report interpreter program at instruction 1304.

Instruction 1414 causes a recommended X-47 sedan to be selected for the customer. When the sedan selection has been stored, the program goes to the end instruction 1418 and proceeds as previously described.

Instruction 1416 causes a G-70 Mini-Van designation to be stored as the recommended vehicle. After execution of instruction 1416 the program advances to the end instruction 1418 and proceeds as previously described.

Referring to FIG. 11, if the subroutine 1400 proceeds to the decision instruction 1408, the program determines the age group of the customer. In this regard, if the customer is between the ages of 16 and 50 the program goes to instruction box 1412 and proceeds as previously described. If the customer is between the ages of 51 and 100, the program advances to instruction box 1414 and proceeds as previously described.

Considering now the SELECT TESTIMONIAL subroutine 1500 in greater detail with reference to FIGS. 10 and 12, the subroutine 1500 is called at instruction box 1304 immediately after the SELECT RECOMMENDED CAR subroutine 1400 has been executed. In this regard, from instruction box 1304, the program advances to the start instruction 1502 (FIG. 12) in the SELECT TESTIMONIAL subroutine 1500.

From the start instruction 1502, the program goes to a decision box 1504 to determine whether the selected customer is a male or female from the processed data information. If the selected customer is a male, the program advances to a decision box 1506. If the selected customer is a female, the program goes to a decision box 1508.

At decision box 1506, the program determines which type of vehicle was recommended for the selected male customer. In this regard, if a G-2 sports car was selected, the program proceeds to a decision box 1510. If an X-47 sedan was selected, the program advances to a decision box 1512. If a G-70 mini-van was selected, the program goes to a decision box 1514. If a G-49 4×4 vehicle was selected the program proceeds to a decision box 1516.

At decision box 1508, the program determines which type of vehicle was recommended for the selected female customer. In this regard, if a G-2 sports car was selected, the program goes to a decision box 1518; if a X-47 sedan was selected, the program proceeds to a decision box 1520; if an X-47 sedan was selected, the program advances to a decision box 1522; and if a G-49 4×4 vehicle was selected the program goes to a decision box 1524.

At decision boxes 1510–1524, the program determines the age group of the selected customer and based on the determined age group, the program proceeds to an instruction to select a given testimonial by a male or female person in the same age group of the customer. Table A summarizes the age groups in each of the decision instruction boxes 1510–1524 and the destination testimonial instructions box that each proceeds relative to the instruction boxes 1510–1524.

It should be understood, that when a testimonial instruction is executed, the program stores the testimonial selection in processed data 203, such as the testimonial of Adam Jones on segment 22 for example. Also after each testimonial segment is selected, the program advances to an end instruction 1570 that causes the program to return to the interpreter program 207 at instruction 1306.

TABLE A

| Decision Instr. | Age Group | Testim. Destin. Instr. | Decision Instr. | Age Group | Testim. Destin. Instr. |
| --- | --- | --- | --- | --- | --- |
| 1510 | 16–25 | 1530 | 1518 | 16–25 | 1550 |
| 1510 | 26–35 | 1531 | 1518 | 26–35 | 1551 |
| 1510 | 36–50 | 1532 | 1518 | 36–50 | 1552 |
| 1510 | 51–100 | 1533 | 1518 | 51–100 | 1553 |
| 1512 | 16–25 | 1534 | 1520 | 16–25 | 1554 |
| 1512 | 26–35 | 1535 | 1520 | 26–35 | 1555 |
| 1512 | 36–50 | 1536 | 1520 | 36–50 | 1556 |
| 1512 | 51–100 | 1537 | 1520 | 51–100 | 1557 |
| 1514 | 16–25 | 1538 | 1522 | 16–25 | 1558 |
| 1514 | 26–35 | 1539 | 1522 | 26–35 | 1559 |
| 1514 | 36–50 | 1540 | 1522 | 36–50 | 1560 |
| 1514 | 51–100 | 1541 | 1522 | 51–100 | 1561 |
| 1516 | 16–25 | 1542 | 1524 | 16–25 | 1562 |
| 1516 | 26–35 | 1543 | 1524 | 26–35 | 1563 |
| 1516 | 36–50 | 1544 | 1524 | 36–50 | 1564 |
| 1516 | 51–100 | 1545 | 1524 | 51–100 | 1565 |

Considering now the SELECT OPTIONS subroutine 1600 with respect to FIGS. 10 and 13, the subroutine 1600 commences at a start instruction 1602 that is entered from the call instruction 1306 via program 207 (FIG. 10).

After entering the start instruction 1602, the program advances to a decision box instruction 1604 to determine whether or not the selected customer utilizes his or her vehicle for skiing trips. If the customer uses his or her vehicle for such purposes, the program goes to an option selection instruction box 1606. Instruction 1606 causes the selection of video segments which describe three options: white side wall tires, air conditioning, and a ski rack. After selecting and storing the option segments at instruction 1606, the program goes to an end instruction 1610 that causes the program to return to the interpreter program 207 at instruction 1308.

If it is determined at decision box 1604 that the selected customer does not use his or her vehicle for ski trips, the program advances to an option selection instruction box 1608. Instruction 1608 causes the selection of only two options, white side wall tires and air conditioning. After selection and storage of the option segments at instruction 1608, the program advances to the end instruction 1610 and proceeds as previously described.

Considering now the SELECT DEALER subroutine 1700 in greater detail with reference to FIGS. 10 and 14, the call instruction 1308 (FIG. 10) calls the subroutine 1700 causing the program to go to a start instruction 1702 (FIG. 14).

From the start instruction 1702 the program advances to a decision instruction 1704 where the program determines the zip code of the selected customer based on the processed data. Based upon the determined zip code, the program proceeds to an appropriate dealer selection instruction, such as an instruction 1706, 1756, or 1786, for example. It should be understood that the number of dealer selection instructions will be determined by the number of dealers that are distributed throughout the advertising area selected. In this regard, certain dealers can be selected from a multiple number of zip codes.

After the selected dealer information has been determined and stored, each instruction, such as instructions 1706, 1756, 1786 proceeds to an end instruction 1799 which causes the program to return to the interpreter program at an end instruction 1310.

When the end instruction 1310 is executed a processed data file 203 is complete and accessible by the report interpreter 207, which uses the processed data file 203 along with a print report description 221, a label description 213, and a video report description 205 to generate, respectively, a print report file 223, a label file 215, or a video report file 209. Any or all of files 223, 215 and 209 may be generated. Now devices such as 225, 217 and 13 can receive a file 223, 215 and 209 respectively to produce final media output such as a printed report 227, a printed label 219, or a videotape report 19.

For example, printed report 227 (FIGS. 2 and 16) can be produced. From raw data 201, the data preprocessor 36 produces processed data 203. The report interpreter 207 uses processed data 203 and print report description 221 to produce print report file 223. The print report file 223 contains all the information needed by printer 225 to produce printed report 227.

For another example, label 219 (FIGS. 2 and 15) can be produced. From raw data 201, the data preprocessor 36 produces processed data 203. The report interpreter 207 uses processed data 203 and label description 213 to produce label file 215. The label file 215 contains all the information needed by the label printer 217 to produce label 219.

For another example, videotape report 19 (FIGS. 2 AND 17) can be produced. From raw data 201, the data preprocessor 36 produces processed data 203. The report interpreter 207 uses processed data 203 and video report description 205 to produce video report file 209. The video report file 209 contains all the information needed by the video scheduler 13 to cause the servers such as 17, 24, 28 and 38 to produce videotape report 19.

Figure 15:
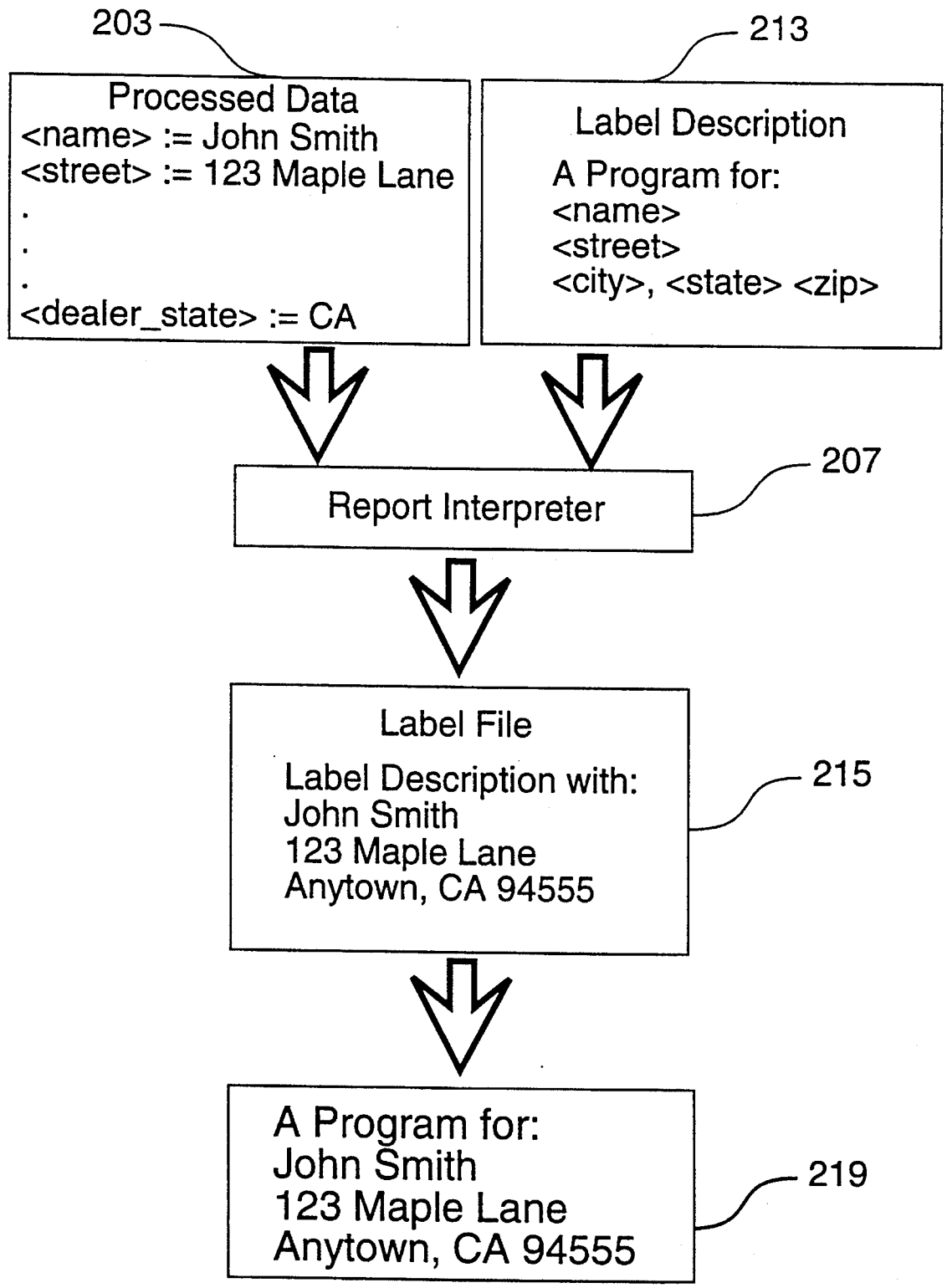
FIG. 15 is a typical application label layout illustrating the placement of processed data on a label of FIG. 2.

The process required to take processed data 203 and create various outputs such as print 227, label 219 and videotape 219 is described herein in greater detail. For example, the report interpreter 207 executing on the computer server 36 takes in processed data 203 and a label description file 213 and produces a label file 215 that causes the label printer 217 to print a label 219 as illustrated in FIGS. 2 and 15.

Figure 16:
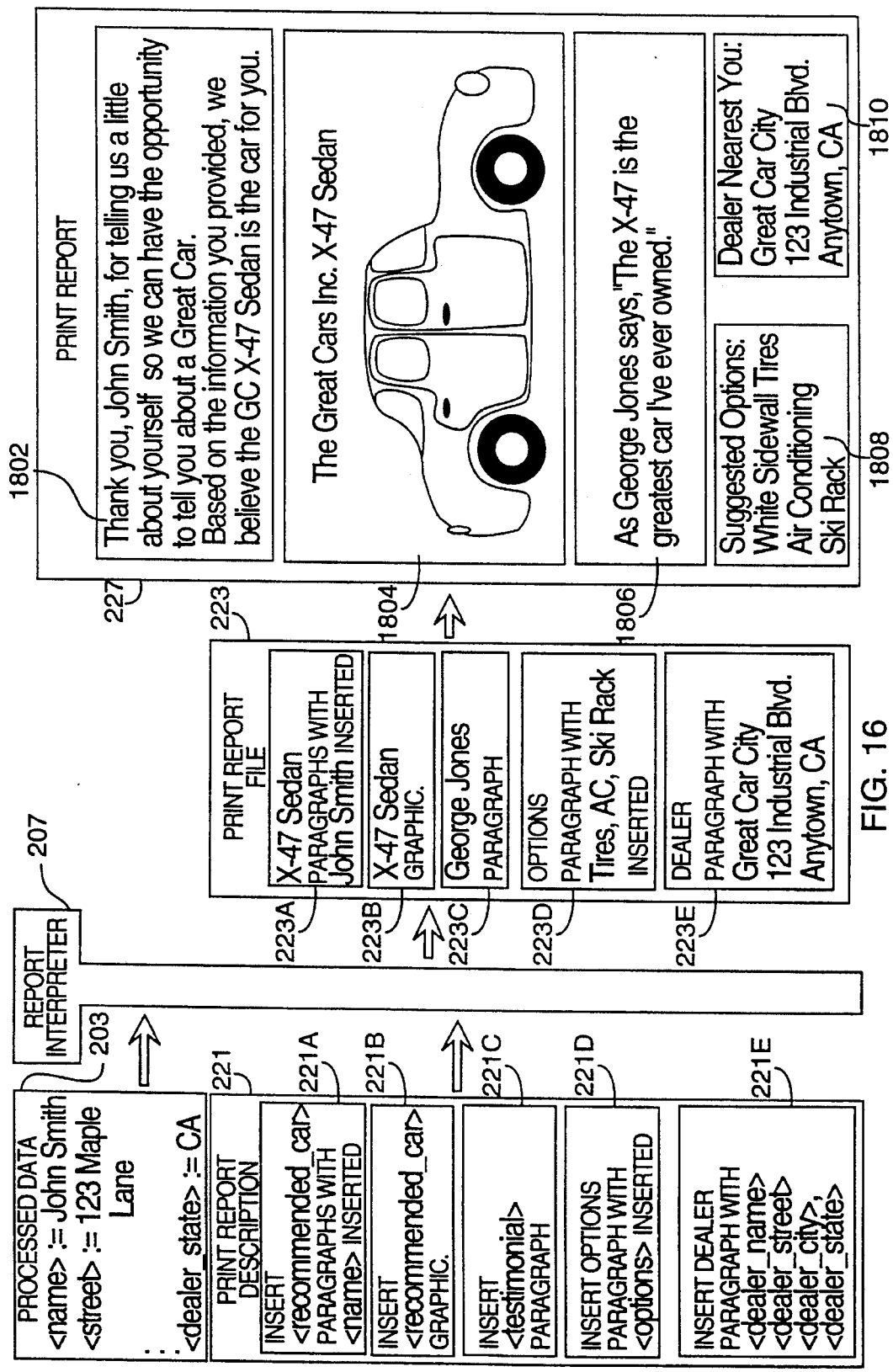
FIG. 16 is a typical application print layout illustrating the placement of processed data on a print report of FIG. 2.

As another example, the report interpreter 207 executing on compute server 36 will create one or more print report files such as print report file 223 which, when sent to the printer causes the report printer 225 (FIG. 2) To produce a print report, such as the print report 227 (FIGS. 2 and 16). In this regard, the compute server 36 receives the recommended car data for a selected customer, such as the X-47 sedan from the processed data file 203, for example. Responsive to the print report description directive 221A, an information segment 223A for example, is stored in the print report file 223 causing the report printer 225 to print the information segment 1802. Another print report description directive 221B causes the storage of information segment 223B causing a recommended car graphic information segment 1804 to be printed. Still other print report description directives 221C, D and E cause the storage of information segments 223C, D and E causing the report printer 225 to print other information segments 1806, 1808 and 1810 respectively.

Figure 17:
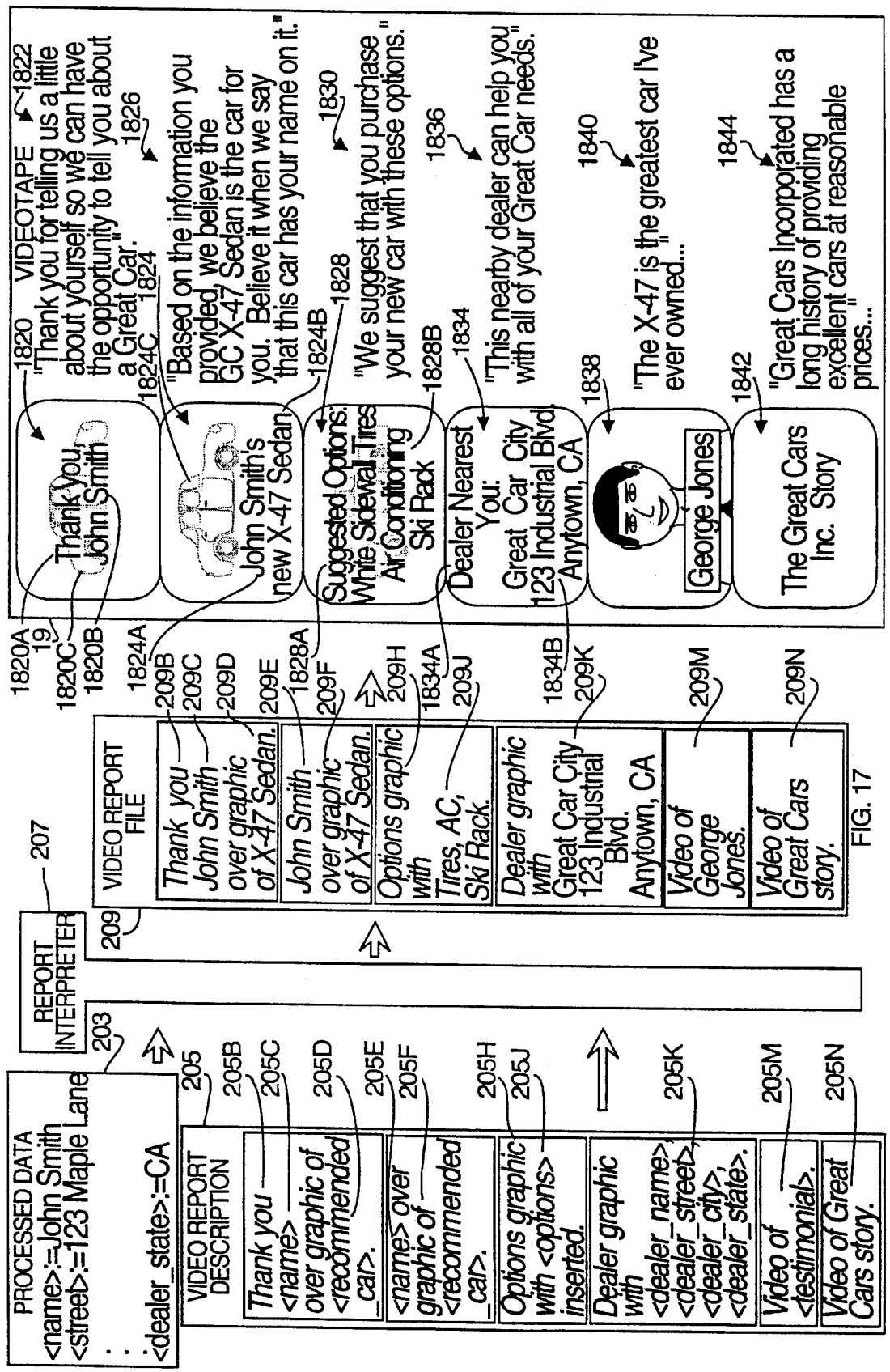
FIG. 17 is a typical application videotape layout illustrating the audio/video/graphic segment placement on a videotape report of FIG. 2.

As a final example the report interpreter 207 executing on compute serve 36 will create one or more video report files such as video report file 209 which, when scheduled with servers 24, 26, 28, 32, 38, 74 and 75 (FIG. 1) causes these servers to produce a video report, such as the video report 19 (FIGS. 2 and 17). In this regard, the compute server 36 receives the name data for a selected customer, such as John Smith from the processed data file 203, for example. Responsive to the video report description directives 205B, C and D, a graphic and audio description containing elements 209B, C and D for example, is stored in the video report file 209. Other video report description directives 205E and F cause the storage of graphic and audio descriptions 209E and F. This process is repeated for video report directives 205H, J, K, M and N causing the storage of graphic and audio descriptions containing elements 209H, J, K, M and N.

After the video report file is complete, servers 24, 26, 28, 32, 38, 74 and 75 (FIG. 1) cooperate to produce the videotape report 19 (FIGS. 2 and 17). In this regard, after a black with silence lead in segment, such as the segment 521 (FIG. 5), is generated, the graphic server 74 causes a 20 second graphic segment 1820 to be generated from a group of video report information 209B, 209C and 209D which are indicative of a (Thank you) textual segment 1820A, a customer name (John Smith) segment 1820B, and a graphic representation (GC X-47 sedan) segment 1820C. While the above mentioned segments are being recorded, a video report information (not shown) causes an audio narration segment 1822 also to be recorded.

After the graphic and narration segments 1820 and 1822 have been recorded, the video report file 209 information enables a 10 second graphic segment 1824 to be generated from another graphic of video report information 209E and F which are indicative of a customer name (John Smith's) segment 1824A, a textual (new X-47 sedan) segment 1824B and a graphic representation (GC X-47 sedan) segment 1824C respectively. While the above graphic segments are being recorded, another video information (not shown) causes an audio narration segment 1826 to be recorded.

At the completion of segment 1824, the video report file 209 enables a 20 second graphic segment 1828 to be generated from another group of video report information 209H and J. Video report information 209H and J are indicative of a pair of options graphic segments 1828A and 1828B to be generated. While segments 1828A and B are being recorded, a video report information (not shown) causes a narration 1830 to also be recorded. A 20 second graphic representation (GC x 47 sedan) segment 1828C is also recorded in response to video report information (not shown).

When segments 1828 and 1830 are completed, a 10 second graphic segment 1834 is recorded indicative of the selected dealer information. In this regard, a video report file information 209K cause a textual (Dealer Nearest You) segment 1834A to be produced, followed by a customized textual segment 1834B. Another video report file information (not shown) enables a narration segment 1836 to be recorded.

A one minute testimonial segment 1838 follows segments 1834 and 1836. In this regard, a video report file information 209M enables one of the videodisc players to supply the testimonial segment designated by instruction box 1536 (FIG. 12) to the videotape report 19. Another video file information (not shown) enables an audio portion 1840 of the testimonial to be routed to the selected destination videocassette recorder.

When segments 1838 and 1840 are completed, a one minute generic video information segment 1842 and audio information segment 1844 are recorded in response to a video report file information 209N. At the completion of segments 1842 and 1844 a black out segment, such as segment 526, is recorded completing the videotape report 19.

Figure 18:
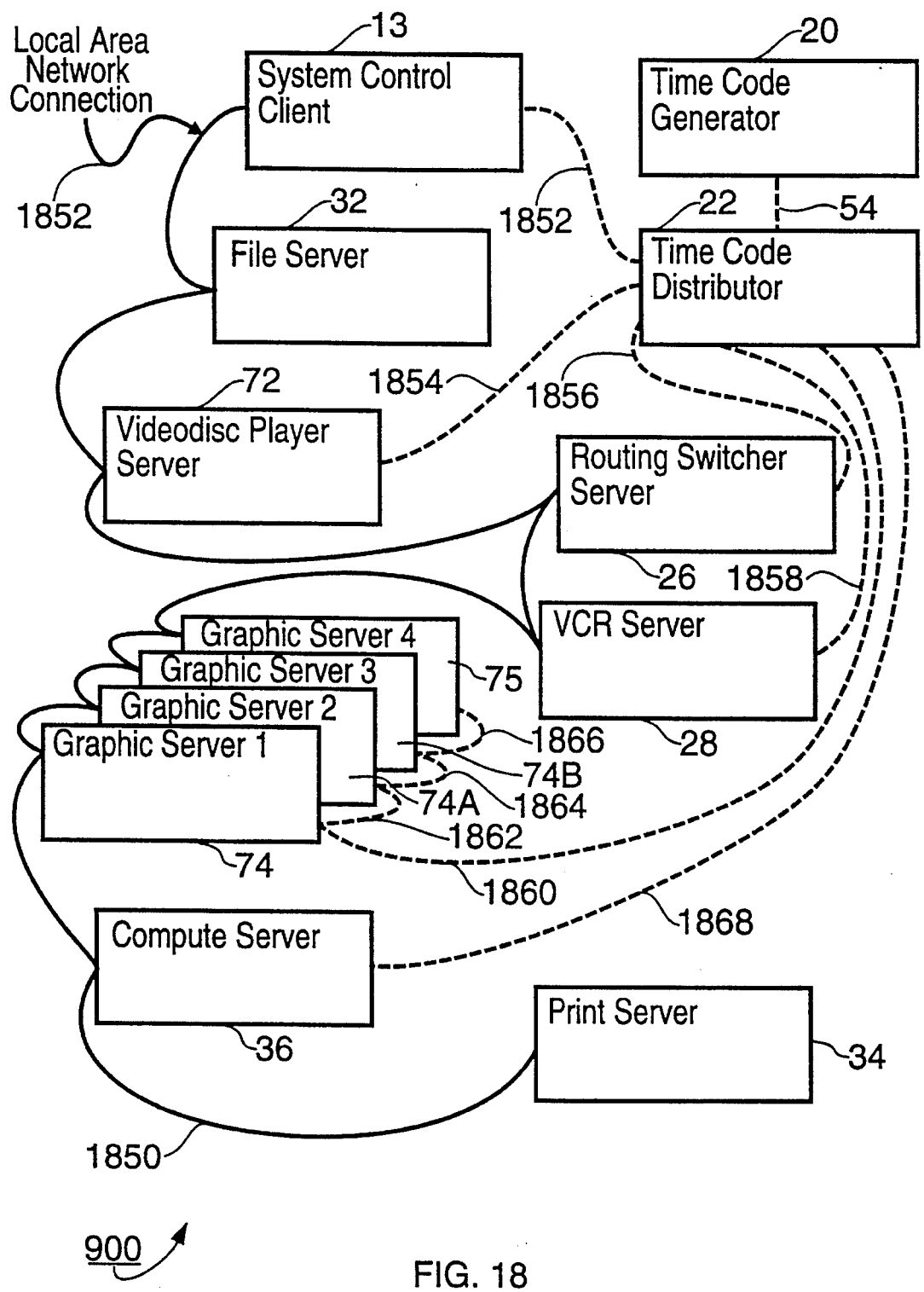
FIG. 18 is a client/server and time code layout diagram for the compiling system of FIG. 1.

Referring now to FIGS. 1 and 18, a client/server and time code layout 1900 is illustrated. In this regard, a series client/server layout routing 1850 interconnects with a local area network connection 1852. The layout routing 1850 proceeds from the system control client 13 to the file server 32, to the videodisc player server 24, to the routing switches server 26, to the VCR server 28, to the graphic servers in group 17, such as servers 74, 74A, 74B and 75, to the compute server 36, and to the print server 34.

A series of time code layouts 1852–1868 are also illustrated. In this regard, the time code generator 20 generates timing signals that are supplied to the time code distributor 22 for distribution to the system servers. Table B illustrates the interconnection layouts between the time code distributor 22 and each of the system servers.

TABLE B

| System Servers | Time Code Distributor Layout Designation |
|---|---|
| System Control Client 13 | 1852 |
| Videodisc Player Server 72 | 1854 |
| Routing Switcher Server | 1856 |
| VCR Server 28 | 1858 |
| Graphic Server 4 | 1860 |
| Graphic Server 3 | 1862 |
| Graphic Server 2 | 1864 |
| Graphic Server 1 | 1866 |
| Computer Server 36 | 1868 |

Figure 9:
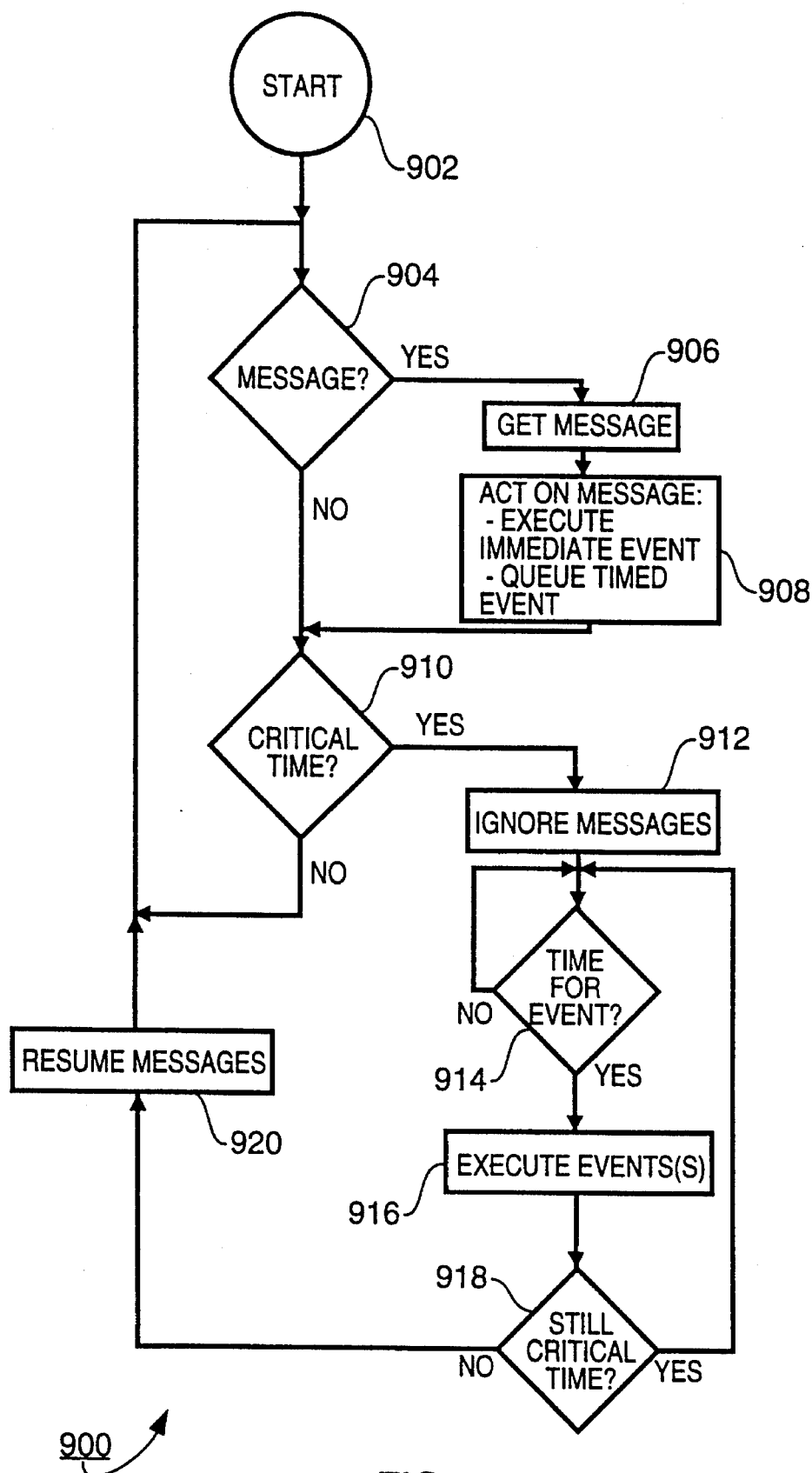
FIG. 9 is a flow diagram for a typical server device of FIG. 1.

Referring now to FIG. 9, a typical process server program 900 is illustrated showing how script messages are accepted, parsed, stored and executed in one of the servers. All the time dependent servers 17, 24, 16 and 28 have a similar structure.

The program 900 starts at 902 and proceeds to a decision box 904 to determine if a production message is available. If a production message is available the program advances to a command box 906. At command box 906 the server retrieves the message from the scheduling processor 13. After retrieving the message, the program goes to command box 908 and acts on the message by determining whether the event requires either an immediate event or queue timing an event.

After determining the type of action required, or if the program is at decision box 904 and a message is not available, the program goes to a decision box 910 to determine whether the current time is close in proximity to the execution time of the next event in the queue. If the current time is not close to a queued event execution time, the program returns to decision box 904 and proceeds as previously described.

If a critical time has been reached, the program goes to command box 912 and ignores further messages from the scheduler. The program then proceeds to a decision box 914 to determine whether it is time for a given event. If it is not time for the event, the program loops at 914 until it is time for the event.

When it is determined that it is time for the event at instruction 914, the program advances to command instruction 916 and executes the event. Once an event has been executed, it is removed from the queue. The program then goes to a decision box 918 to determine whether or not time is still critical.

If time is not critical, the program goes to a command box 920 and resumes receiving messages. After resuming receiving messages, the program returns to the decision box 904 and proceeds as previously described. At decision box 918, if time is still critical, the program returns to decision box 914 and proceeds as previously described.

Referring again to FIG. 9, each server in the system 10, such as the VCR server 28 (FIG. 1) functions in an iterative process that communicates with the system control client 13 (FIG. 1) and with one or more resources on the system. For example, the VCR server 28 (FIG. 1) communicates with all the VCRs on the system.

At the beginning of a server's processing cycle, the server checks for any messages that are sent from the System Control Client 13 to the server via the LAN 12.

If there is a message, the server decodes the message and acts on it. The action performed depends on the content of the message. There are a few different types of messages that are common to all servers:

One type of message is a command to reserve a resource for a given time period to a given job. The server attempts to find a resource that is not reserved for any other job during any moment of the given time period. If the attempt fails, the server replies this to the client and sends with the reply the soonest time when a resource becomes available. If the attempt succeeds, the server stores in its memory a note to keep reserved the resource that it found for the given time period to the given job. For example, the client may send a command to the VCR server to reserve a VCR for a job J from time 1:23:00:00 to time 2:23:00:00, and the server can send back the reply, "VCR-1."

A second type of message is a command to perform a given operation on a given resource at a given time for a given job. This type of message is called a "timed event." Upon receiving this message, the server first checks that the given job has reserved the given resource at the given time. If this is not true, and if another job has the given resource reserved at the given time, a reply that indicates failure is returned to the client. If the job may use the resource, the timed event is added to a queue that resides in the server's memory. For example, the client may send a command to the VCR server to load a tape into VCR-1 at system time 1:23:00:00 for job J.

A third type of message is generally a command to report on the status of a resource or group of resources. For example, the client may send a command to the VCR server to report on the status of VCR-1 at time 1:23:00:00, and the server may reply, "loading tape for job J."

If there is no message waiting, the server examines the system's time and the timed event queue for any timed events that are soon scheduled to occur. How soon is specified as a "critical period."

If no event is scheduled to occur within the critical period, the server checks for a message and proceeds as described above.

If one or more events are scheduled to occur within the critical period, the server suspends message receiving. Then, for each of these events, the server waits for the exact time to actuate the event. At this time, the server acts on the event by communicating the specified operation to the specified resource. Then, the server removes the event from the event queue. For example, the event may be to load a tape into VCR-1 at time 1:23:00:00, and at this time the VCR server sends a command to VCR-1 to load a tape. Then, the server examines the system's time and the event queue to determine if there is still a critical period in effect.

If there is still a critical period, the server waits for event times and proceeds as described above.

If there is no critical period in effect, the server resumes the receiving of messages and checks for messages and proceeds as described above.

To those skilled in the art it will be apparent that since the production methods employed occur in real time, the resulting programs may either be viewed at the time of production such as over a cable television channel or, as described in detail, recorded for later viewing.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A compiling system for compiling customized information segment sequences from various information segments, comprising:

M number of destination means for receiving Z number of customized information segment sequences, wherein M and Z are at least equal to two;

N number of resource means coupled to said destination means for storing the various information segments to be transmitted to said destination means for forming said customized information segment sequences, each of said resource means stores at least one information segment which is unique to that resource means, wherein N is at least equal to one;

routing means coupled between said resource means and said destination means for enabling said destination means to access said resource means to supply the information segments to said destination means;

processing means coupled to said routing means for storing user information signals indicative of all of said customized information segment sequences to be compiled, each one of said customized information segment sequences being associated with a given sequence time period;

allocating means coupled to said processing means for allocating said resource means to said destination means on a time sharing basis according to said user information signals for enabling each one of said destination means to access the information segments stored on said resource means;

scheduling means coupled to said processing means and said allocating means for generating a schedule for the compilation of each one of said customized information segment sequences on selected ones of said destination means to enable each one of said destination means to receive the information segments from said resource means without interruption in a time ordered manner for compiling a group of customized information segment sequences during a compiling time period, the customized information segment sequence group including P number of said customized information segment sequences, wherein P is at least equal to two and is less than or equal to M number of destination means, and said compiling time period is substantially less than the combined total of individual ones of said sequence time periods for said P number of customized information segment sequences; and server means coupled to said scheduling means for supplying the information segments to said destination means according to said schedule for compiling said group of customized information segment sequences during a first one of said compiling time periods;

said server means for subsequently supplying the information segments to said destination means according to said schedule for compiling another group of customized information segment sequences during another compiling time period; and said server means for continuing to supply information segments to said destination means in additional groups of customized information segment sequences during additional compiling time periods until all of said customized information segment sequences have been compiled.

2. A compiling system according to claim 1, further comprising:

Y number of graphic resource means coupled to said routing means for storing graphic information segments, wherein Y is at least one; and graphic server means responsive to said scheduling means for supplying at least one of said graphic information segments to said destination means for forming said customized information segment sequences.

3. A compiling system according to claim 2, wherein said graphic resource means is a graphic generator.

4. A compiling system according to claim 3, wherein said graphic generator is a graphic work station.

5. A compiling system according to claim 3, wherein said graphic generator produces customized graphic images for videotapes.

6. A compiling system according to claim 2, further comprising scheduling algorithm means for scheduling use of said destination means, said resource means, and said graphic resource means to facilitate the supplying of information segments and graphic information segments to one or more of said destination means for compiling said group of customized information segment sequences, wherein one or more of said customized information segment sequences of said group contain at least one graphic information segment.

7. A compiling system according to claim 1, wherein said routing means includes a routing switcher unit and a routing switcher control unit.

8. A compiling system, according to claim 1, wherein said scheduling means includes a system control client processor.

9. A method of compiling customized information segment sequences from an assortment of information segments, comprising:

using M number of destination means for receiving Z number of customized information Segment sequences, wherein M and Z are at least equal to two;

using N number of resource means coupled to said destination means for storing the assortment of information segments to be transmitted to said destination means for forming said customized information segment sequences, each of said resource means stores at least one information segment which is unique to that resource means, wherein N is at least equal to one;

storing user information signals indicative of all of said customized information segment sequences to be compiled, each of said customized information segment sequences extending over an associated sequence time period and including at least one of the information segments;

allocating said resource means to said destination means on a time sharing basis according to said user information signals for enabling each of said destination means to access the information segments stored on said resource means;

generating a schedule for the compilation of each of said customized information segment sequences on one of said destination means to enable each of said destination means to receive the information segments from said resource means without interruption in a time ordered manner for compiling a group of customized information segment sequences during a compiling time period, said group of customized information segment sequences including P number of said customized information segment sequences wherein P is at least two and is less than or equal to M, and said compiling time period is substantially less than the sum of said sequence time periods for said P number of customized information segment sequences; and supplying the information segments to said destination means according to said schedule for compiling said group of customized information segment sequences during said compiling time period.

10. A method of compiling according to claim 9, further comprising:

using Y number of graphic resource means for storing graphic information segments, wherein Y is at least one; and supplying at least one of said graphic information segments to said destination means for forming said customized information segment sequences according to said schedule.

11. A method of compiling customized information segment sequences according to claim 9, further comprising:

subsequently supplying the information segments to said destination means according to said schedule for compiling another group of customized information segment sequences during another compiling time period; and continuing to subsequently supply information segments to said destination means in additional groups of customized information segment sequences during additional compiling time periods until all of said customized information segment sequences have been compiled.

12. A compiling system, comprising:

a plurality of destination means for receiving a plurality of customized information segment sequences;

a plurality of resource means coupled to said destination means for storing a plurality of information segments to be transmitted to said destination means to form said customized information segment sequences, wherein each of said resource means stores at least one information segment which is unique to that resource means;

routing means coupled between said destination means and said resource means for enabling said destination means to access said resource means to supply individual ones of said information segments stored by said resource means to said destination means in a controlled manner;

network means coupled to said routing means for controlling the supply of said information segments from said resource means to said destination means to enable said customized information segment sequences to be compiled on said destination means;

video report means coupled to said network means for generating user information signals indicative of each of said customized information segment sequences to be compiled to facilitate the allocation of said resource means to said destination means in a time sharing manner, each of said customized information segment sequences extending over an associated sequence time period and including at least one of said information segments;

scheduling means coupled to said network means for generating script information in response to said user information signals to compile each of said customized information segment sequences on one of said destination means to enable each of said destination means to receive the information segments from said resource means without interruption in a time ordered manner for compiling a group of customized information segment sequences during a compiling time period, wherein said compiling time period is substantially less than the sum of each of said sequence time periods for said group of customized information segment sequences;

said network means including server means responsive to said script information for controlling each of said resource means to supply said information segments to said destination means for compiling said group of customized information segment sequences during said compiling time period.

13. A compiling system according to claim 12, wherein said server means includes resource server means for controlling the plurality of resource means.

14. A compiling system according to claim 12, wherein said server means includes a destination device server for controlling the plurality of destination means.

15. A compiling system according to claim 12, further comprising:

a video monitor for receiving output signals from at least one of the plurality of destination means.

16. A compiling system according to claim 12, wherein said scheduling means includes off-line mode means for controlling at least an individual one of the resource means to operate in an off-line mode to permit access to one of the information segments in preparation of supplying said one information segment to a selected one of the destination means when the selected one of the destination means is available to receive said information segment according to said script information without conflict.

* * * * *

UNITED STATES PATENT AND TRADEMARK OFFICE
CERTIFICATE OF CORRECTION

PATENT NO. : 5,550,735
DATED : August 27, 1996
INVENTOR(S) : Michael G. Slade, et al.

It is certified that error appears in the above-indentified patent and that said Letters Patent is hereby corrected as shown below:

Column 26, line 44, delete "Segment", and substitute therefor --segment--.

Signed and Sealed this

Twenty-second Day of July, 1997

Attest:

BRUCE LEHMAN

*Attesting Officer*  Commissioner of Patents and Trademarks